(12) United States Patent
Kamizuma et al.

(10) Patent No.: US 8,346,180 B2
(45) Date of Patent: *Jan. 1, 2013

(54) TRANSCEIVER

(75) Inventors: Hiroshi Kamizuma, Kokubunji (JP); Satoshi Tanaka, Kokubunji (JP); Taizo Yamawaki, Tokyo (JP); Yukinori Akamine, Kokubunji (JP); Koji Maeda, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,249

(22) Filed: Sep. 21, 2011

(65) Prior Publication Data

US 2012/0069876 A1    Mar. 22, 2012

Related U.S. Application Data

(63) Continuation of application No. 12/336,178, filed on Dec. 16, 2008, now Pat. No. 8,036,605.

(30) Foreign Application Priority Data

Dec. 17, 2007 (JP) ................................ 2007-324657

(51) Int. Cl.
*H04B 1/38* (2006.01)

(52) U.S. Cl. .......................................... 455/73; 455/78

(58) Field of Classification Search ................... 455/73, 455/78, 118, 323; 327/113; 375/344
See application file for complete search history.

(56) References Cited

U.S. PATENT DOCUMENTS 7,508,898 B2 * 3/2009 Cyr et al. ...................... 375/376
(Continued)

FOREIGN PATENT DOCUMENTS

| JP | 2000-269848 A | 9/2000 |
| JP | 2002-280924 A | 9/2002 |

OTHER PUBLICATIONS

Daniel L. Kaczman et al., "A single-Chip Tri-Band (2100, 1900, 850/800 MHz) WCDMA/HSDPA Cellular Transceiver", IEEE Journal of Solid-State Circuits, vol. 41, No. 5, May 2006, pp. 1122-1132.

(Continued)

*Primary Examiner* — Brian Young
(74) *Attorney, Agent, or Firm* — Miles and Stockbridge P.C.

(57) ABSTRACT

A transceiver includes an oscillator and a plurality of communication blocks. Each of the communication blocks includes frequency dividers and mixers. Frequency dividing number of the frequency divider included in one communication block is set to an even-numbered integer, and transmission local signals supplied from the frequency dividers to the mixer become quadrature signals having a phase difference of 90 degrees. The frequency dividing number of another frequency divider in the another communication block is set to a non-integer, and communication local signals supplied from the frequency divider to the mixers become non-quadrature signals having a phase difference at a predetermined offset angle from 90 degrees. The transceiver further includes a converting unit for giving a compensation offset amount having almost the same absolute value and having a polarity opposite to that of the offset angle to communication analog signals related to the mixer of the another communication block.

20 Claims, 18 Drawing Sheets

U.S. PATENT DOCUMENTS

| | | |
|---|---|---|
| 7,570,926 B2 | 8/2009 | Behzad |
| 7,583,934 B2 | 9/2009 | Fischer |
| 7,636,554 B2 | 12/2009 | Sugar et al. |
| 7,684,763 B2 | 3/2010 | Boos |
| 8,036,605 B2 * | 10/2011 | Kamizuma et al. ............ 455/73 |
| 8,078,119 B2 * | 12/2011 | Gorbachov .................... 455/83 |
| 8,086,188 B2 * | 12/2011 | Tanaka et al. .................. 455/73 |

OTHER PUBLICATIONS

Chun-Lin Ko et al., "A CMOS Dual-Mode RF Front-End Receiver for GSM and WCDMA", 2004 IEEE Asia-Pacific Conference on Advanced System Integrated Circuits (AP-ASIC2004), Aug. 4 and 5, 2004, pp. 374-377.

U.S. Appl. No. 12/135,190, filed Jun. 8, 2008—Tanaka et al.

\* cited by examiner

Fig.3

| Mode | Band | Loc.sg.frq [MHz] | | Divider | VCO freq. [MHz] | | VCO |
|---|---|---|---|---|---|---|---|
| | | Min. | Max. | Div. Ratio | Min. | Max. | |
| W-CDMA UL | I | 1920 | 1980 | 1/2 | 3840 | 3960 | VCOA(3320~3960) Ratio BW [16.8 %] |
| | II | 1850 | 1910 | 1/2 | 3700 | 3820 | |
| | VI | 830 | 840 | 1/4 | 3320 | 3360 | |
| | XI | 1428 | 1453 | 1/2 | 2856 | 2906 | VCOB(2856~2906) Ratio BW [17.2%] |

Fig.4

| Mode | Band | Loc.sg.frq [MHz] | | Divider | VCO freq. [MHz] | | VCO |
|---|---|---|---|---|---|---|---|
| | | Min. | Max. | Div. Ratio | Min. | Max. | |
| W-CDMA UL | I | 1920 | 1980 | 1/2 | 3840 | 3960 | VCO3 (2856~3960) Ratio BW [27.9 %] |
| | II | 1850 | 1910 | 1/2 | 3700 | 3820 | |
| | VI | 830 | 840 | 1/4 | 3320 | 3360 | |
| | XI | 1428 | 1453 | 1/2 | 2856 | 2906 | |

Fig. 6

| Mode | Band | Loc.sg.frq [MHz] | | Divider | | VCO freq. [MHz] | | VCO |
|---|---|---|---|---|---|---|---|---|
| | | Min. | Max. | Div.Ratio | Offset Ang [deg.] | Min. | Max. | |
| W-CDMA UL | I | 1920 | 1980 | 1/2 | 0 | 3840 | 3960.0 | VCO3 (3320~3960) Ratio BW [16.8 %] |
| | II | 1850 | 1910 | 1/2 | 0 | 3700 | 3820.0 | |
| | VI | 830 | 840 | 1/4 | 0 | 3320 | 3360.0 | |
| | 1.5G | 1428 | 1453 | 2/5 | −18 | 3570 | 3632.5 | |

Fig.11

| Mode | Band | Loc.sg.frq [MHz] | | Divider | | VCO freq. [MHz] | | VCO |
|---|---|---|---|---|---|---|---|---|
| | | Min. | Max. | Div. Ratio | Offset Ang [deg.] | Min. | Max. | |
| W-CDMA UL | I | 2110 | 2170 | 1/2 | 0 | 4220 | 4340.0 | VCO (3500~4340) Ratio BW [19.9 %] |
| | II | 1930 | 1990 | 1/2 | 0 | 3860 | 3980.0 | |
| | VI | 875 | 885 | 1/4 | 0 | 3500 | 3540.0 | |
| | XI | 1476 | 1501 | 2/5 | -18 | 3690 | 3752.5 | |

Fig.14

| Mode | Band | Tx freq. [MHz] | | LO divider | | Tx LO VCO freq. [MHz] | | VCO |
|---|---|---|---|---|---|---|---|---|
| | | Min. | Max. | M/N | θn [deg.] | Min. | Max. | |
| W-CDMA UL | I | 1920 | 1980 | 1/2 | 90 | 3840 | 3960.0 | VCO (3296~3960) Ratio BW [16.8 %] |
| | II | 1850 | 1910 | 1/2 | 90 | 3700 | 3820.0 | |
| | III | 1710 | 1785 | 1/2 | 90 | 3420 | 3570.0 | |
| | IV | 1710 | 1755 | 1/2 | 90 | 3420 | 3510.0 | |
| | V | 824 | 849 | 1/4 | 90 | 3296 | 3400.0 | |
| | VI | 830 | 840 | 1/4 | 90 | 3320 | 3360.0 | |
| | VII | 2500 | 2570 | 2/3 | 120 | 3750 | 3855.0 | |
| | VIII | 880 | 915 | 1/4 | 90 | 3520 | 3660.0 | |
| | IX | 1750 | 1785 | 1/2 | 90 | 3490 | 3570.0 | |
| | X | 1710 | 1770 | 1/2 | 90 | 3420 | 3540.0 | |
| | XI | 1428 | 1453 | 2/5 | 72 | 3570 | 3632.5 | |

| Mode | Band | Rx freq. [MHz] | | LO divider | | Rx LO VCO freq. [MHz] | | VCO |
|---|---|---|---|---|---|---|---|---|
| | | Min. | Max. | L/K | θn [deg.] | Min. | Max. | |
| W-CDMA DL | I | 2110 | 2170 | 1/2 | 90 | 4220 | 4340.0 | VCO (3476~4340) Ratio BW [19.9 %] |
| | II | 1930 | 1990 | 1/2 | 90 | 3860 | 3980.0 | |
| | III | 1805 | 1880 | 1/2 | 90 | 3610 | 3760.0 | |
| | IV | 2110 | 2155 | 1/2 | 90 | 4220 | 4310.0 | |
| | V | 869 | 894 | 1/4 | 90 | 3476 | 3576.0 | |
| | VI | 875 | 885 | 1/4 | 90 | 3500 | 3540.0 | |
| | VII | 2620 | 2690 | 2/3 | 120 | 3930 | 4035.0 | |
| | VIII | 925 | 960 | 1/4 | 90 | 3700 | 3840.0 | |
| | IX | 1844.9 | 1879.9 | 1/2 | 90 | 3690 | 3760.0 | |
| | X | 2110 | 2170 | 1/2 | 90 | 4220 | 4340.0 | |
| | XI | 1476 | 1496 | 2/5 | 72 | 3690 | 3752.5 | |

Fig.15

| Mode | Band | Tx freq. [MHz] | | LO divider | | Tx LO VCO freq. [MHz] | | VCO |
|---|---|---|---|---|---|---|---|---|
| | | Min. | Max. | M/N | Δφ [deg.] | Min. | Max. | |
| W-CDMA UL | I | 1920 | 1980 | 1/2 | 90 | 3840 | 3960 | VCO (3520~4016.3) Ratio BW [12.3 %] |
| | II | 1850 | 1910 | 1/2 | 90 | 3700 | 3820 | |
| | III | 1710 | 1785 | 4/9 | 80 | 3847.5 | 4016.3 | |
| | IV | 1710 | 1755 | 4/9 | 80 | 3847.5 | 3948.8 | |
| | V | 824 | 849 | 2/9 | 80 | 3708 | 3820.5 | |
| | VI | 830 | 840 | 2/9 | 80 | 3735 | 3780 | |
| | VII | 2500 | 2570 | 2/3 | 120 | 3750 | 3855 | |
| | VIII | 880 | 915 | 1/4 | 90 | 3520 | 3660 | |
| | IX | 1750 | 1785 | 4/9 | 80 | 3937.5 | 4016.3 | |
| | X | 1710 | 1770 | 4/9 | 80 | 3847.5 | 3982.5 | |
| | XI | 1428 | 1453 | 2/5 | 72 | 3570 | 3632.5 | |

| Mode | Band | Rx freq. [MHz] | | LO divider | | Rx LO VCO freq. [MHz] | | VCO |
|---|---|---|---|---|---|---|---|---|
| | | Min. | Max. | L/K | Δφ [deg.] | Min. | Max. | |
| W-CDMA DL | I | 2110 | 2170 | 1/2 | 90 | 4220 | 4340 | VCO (3690~4340) Ratio BW [15.0 %] |
| | II | 1930 | 1990 | 1/2 | 90 | 3860 | 3980 | |
| | III | 1805 | 1880 | 4/9 | 80 | 4061.3 | 4230 | |
| | IV | 2110 | 2155 | 1/2 | 90 | 4220 | 4310 | |
| | V | 869 | 894 | 2/9 | 80 | 3910.5 | 4023 | |
| | VI | 875 | 885 | 2/9 | 80 | 3937.5 | 3982.5 | |
| | VII | 2620 | 2690 | 2/3 | 120 | 3930 | 4035 | |
| | VIII | 925 | 960 | 2/9 | 80 | 4162.5 | 4320 | |
| | IX | 1844.9 | 1879.9 | 4/9 | 80 | 4151.1 | 4229.8 | |
| | X | 2110 | 2170 | 1/2 | 90 | 4220 | 4340 | |
| | XI | 1476 | 1501 | 2/5 | 72 | 3690 | 3752.5 | |

Fig.16

| Mode | Band | Tx freq. [MHz] | | LO divider | | Tx LO VCO freq. [GHz] | | VCO |
|---|---|---|---|---|---|---|---|---|
| | | Min. | Max. | M/N | Δφ [deg.] | Min. | Max. | |
| W-CDMA UL | I | 1920 | 1980 | 1/5 | 72 | 9.6 | 9.9 | VCO (9.6~11.65) Ratio BW [17.6%] |
| | II | 1850 | 1910 | 1/6 | 90 | 11.1 | 11.46 | |
| | III | 1710 | 1785 | 1/6 | 90 | 10.26 | 10.71 | |
| | IV | 1710 | 1755 | 1/6 | 90 | 10.26 | 10.53 | |
| | V | 824 | 849 | 1/12 | 90 | 9.88 | 10.19 | |
| | VI | 830 | 840 | 1/12 | 90 | 9.96 | 10.08 | |
| | VII | 2500 | 2570 | 2/9 | 80 | 11.25 | 11.57 | |
| | VIII | 880 | 915 | 1/12 | 90 | 10.56 | 10.98 | |
| | IX | 1750 | 1785 | 1/6 | 90 | 10.5 | 10.71 | |
| | X | 1710 | 1770 | 1/6 | 90 | 10.26 | 10.62 | |
| | XI | 1428 | 1453 | 2/15 | 96 | 10.71 | 10.90 | |
| 802.11a | | 5150 | 5825 | 1/2 | 90 | 10.3 | 11.65 | |
| 802.11b,g | | 2400 | 2500 | 1/4 | 90 | 9.6 | 10.0 | |

| Mode | Band | Rx freq. [MHz] | | LO divider | | Rx LO VCO freq. [GHz] | | VCO |
|---|---|---|---|---|---|---|---|---|
| | | Min. | Max. | L/K | Δφ [deg.] | Min. | Max. | |
| W-CDMA DL | I | 2110 | 2170 | 1/5 | 72 | 10.55 | 10.85 | VCO (9.6~11.65) Ratio BW [17.6 %] |
| | II | 1930 | 1990 | 1/5 | 72 | 9.65 | 9.95 | |
| | III | 1805 | 1880 | 1/6 | 90 | 10.83 | 11.28 | |
| | IV | 2110 | 2155 | 1/5 | 72 | 10.55 | 10.78 | |
| | V | 869 | 894 | 1/12 | 90 | 10.42 | 10.73 | |
| | VI | 875 | 885 | 1/12 | 90 | 10.5 | 10.62 | |
| | VII | 2620 | 2690 | 1/4 | 90 | 10.48 | 10.76 | |
| | VIII | 925 | 960 | 1/12 | 90 | 11.1 | 11.52 | |
| | IX | 1844.9 | 1879.9 | 1/6 | 90 | 10.07 | 11.28 | |
| | X | 2110 | 2170 | 1/5 | 72 | 10.55 | 10.85 | |
| | XI | 1476 | 1501 | 2/15 | 96 | 11.07 | 11.26 | |
| 802.11a | | 5150 | 5825 | 1/2 | 90 | 10.3 | 11.65 | |
| 802.11b,g | | 2400 | 2500 | 1/4 | 90 | 9.6 | 10.0 | |

TRANSCEIVER

CLAIM OF PRIORITY

This application is a continuation of application Ser. No. 12/336,178 filed Dec. 16, 2008 now U.S. Pat. No. 8,036,605. The present application also claims priority from Japanese application JP 2007-324657 filed on Dec. 17, 2007, the content of which is hereby incorporated by reference into this application.

FIELD OF THE INVENTION

The present invention relates to a transceiver having a receiver and a transmitter for use in an RF communication such as a wireless LAN. More particularly, the invention relates to a technique effective for suppressing increase in the number of voltage controlled oscillators or broadening of the band of a voltage controlled oscillator for communication and increase in phase noise accompanying the broadening of the band.

BACKGROUND OF THE INVENTION

Various communication methods such as cellular communication systems typified by Global System for Mobile Communication (GSM), General Packet Radio Service (GPRS), Enhanced Data for GSM Evolution; Enhanced Data for GPRS (EDGE), Wideband Code Division Multiple Access (WCDMA), Digital Cellular System (DCS), and Personal Communication System (PCS) and a wireless LAN are being developed. In recent years, a multimode/multiband transceiver as a single terminal adapted to a plurality of communication methods and transmission/reception frequency bands is in demand. Patent document 1 described below discloses a multiband transceiver. A transmitter includes a quadrature modulator for up-converting a transmission baseband signal to an intermediate frequency transmission signal, a band pass filter, an up-converter for generating an RF transmission signal from the intermediate frequency transmission signal and an RF local signal, and a high power amplifier. The quadrature modulator includes a π/2 phase shifter to which an intermediate frequency local signal of 200 MHz from a local oscillator is supplied, two mixers to which the transmission baseband signal and two intermediate frequency local signals having a phase difference of π/2 (90 degrees) generated by the π/2 phase shifter are supplied, and an adder coupled to the two mixers. For multiband transmission, two RF local oscillators and two frequency dividers are used.

Non-patent document 1 below describes an integrated circuit (IC) for a tri-band third-generation cellular transceiver of 2100, 1900, and 850/800 MHz for worldwide use. The RF transceiver has a baseband signal processing IC for the tri-band WCDMA, and the quad band GSM/EDGE. In the non-patent document 1, the following six frequency bands proposed by 3rd Generation Partnership Project (3GPP) are described.

| Band | Uplink | Downlink | Unit | Area |
| --- | --- | --- | --- | --- |
| Band I | 1920 to 1980 | 2110 to 2170 | MHz | Europe |
| Band II | 1850 to 1910 | 1930 to 1990 | MHz | U.S.A. |
| Band III | 1710 to 1785 | 1805 to 1880 | MHz | Europe |
| Band IV | 1710 to 1755 | 2110 to 2155 | MHz | U.S.A. |
| Band V | 824 to 849 | 869 to 894 | MHz | U.S.A. |
| Band VI | 830 to 840 | 875 to 885 | MHz | Japan |

The RF integrated transceiver described in the non-patent document 1 also includes a receiver to which RF reception signals of downlink frequencies of the bands III and V are supplied, a transmitter for generating RF transmission signals of the uplink frequencies of the bands III and V, and a frequency synthesizer. The frequency synthesizer includes two integrated voltage-controlled oscillators (VCO) for the receiver and the transmitter and two fractional N synthesizers. As well known, by using the fractional N synthesizers, the frequency dividing number of the frequency divider of a PLL circuit is set to not only integers but also fractions. Consequently, an oscillation frequency other than integer times of reference frequency can be obtained from output of the voltage-controlled oscillator (VCO).

The receiver includes a first reception mixer to which an RF reception signal having a downlink frequency of about 2 GHz of the bands I and II is supplied, and a second reception mixer to which an RF reception signal having the downlink frequency of about 0.9 GHz of the band V is supplied. Between a reception voltage-controlled oscillator (RxVCO) covering the frequency band of 3476 to 4340 MHz and the first and second reception mixers, a reception frequency divider capable of setting frequency dividing numbers 2 and 4 is coupled.

The transmitter includes a first transmission mixer for generating an RF transmission signal having an uplink frequency of about 1.9 GHz of the bands I and II, and a second transmission mixer for generating an RF transmission signal having an uplink frequency of about 0.8 GHz of the band V. Between a transmission voltage-controlled oscillator (TX-VCO) covering the frequency band of 3296 to 3960 MHz and the first transmission mixer, a first transmission frequency divider in which the frequency dividing number is set to 2 is coupled. Between the transmission voltage-controlled oscillator (TXVCO) and the second transmission mixer, a second transmission frequency divider in which the frequency dividing number is set to 4 is coupled.

On the other hand, non-patent document 2 describes an RF front-end receiver chip to which three frequency bands of an RF reception signal of WCDMA, an RF reception signal of GSM900, and an RF reception signal of DCS1800 are supplied. The frequency of the RF reception signal of WCDMA is 2110 to 2170 MHz, the frequency of the RF reception signal of GSM900 is 925 to 960 MHz, and the frequency of the RF reception signal of DCS1800 is 1805 to 1880 MHz. The RF reception signal of WCDMA is supplied to the input of a built-in WCDMA low-noise amplifier via an external low noise amplifier (LNA) and an interstage band-pass filter of a surface acoustic wave (SAW) filter. The RF reception signal of DCS1800 and the RF reception signal of GSM900 are supplied to the input of the built-in DCS1800 low noise amplifier and the input of the built-in GSM900 low noise amplifier, respectively.

An RF reception amplified output signal of the built-in WCDMA low noise amplifier is supplied to the input terminal of one of a pair of first I, Q down-conversion mixers. An external reception local signal from a reception voltage-controlled oscillator (VCO) on the outside of the chip is supplied to a first frequency divider in which the frequency dividing number is set to 2, and a first reception local signal having a phase difference of 90° from an output of the first frequency divider is supplied to the other input terminal of the pair of first I, Q down-conversion mixers.

An RF reception amplified output signal of the built-in DCS1800 low noise amplifier is supplied to the input terminal of one of a pair of second I, Q down-conversion mixers. An external reception local signal from a reception voltage-controlled oscillator (VCO) on the outside of the chip is supplied to a second frequency divider in which the frequency dividing number is set to 2, and a second reception local signal having a phase difference of 90° from an output of the second frequency divider is supplied to the other input terminal of the pair of second I, Q down-conversion mixers.

An RF reception amplified output signal of the built-in GSM900 low noise amplifier is supplied to the input terminal of one of a pair of third I, Q down-conversion mixers. An external reception local signal from a reception voltage-controlled oscillator (VCO) on the outside of the chip is supplied to a third frequency divider in which the frequency dividing number is set to 4, and a third reception local signal having a phase difference of 90° from an output of the third frequency divider is supplied to the other input terminal of the pair of third I, Q down-conversion mixers.

The first I, Q down-conversion mixer pair for WCDMA employs a zero IF architecture whose output frequency is a baseband signal frequency. However, the second down-conversion mixer pair for DCS1800 of GSM and the second down-conversion mixer pair for GSM900 employ a low intermediate frequency (low IF) architecture whose output frequency is higher than the baseband signal frequency. As the down-conversion mixers, well-known double-balanced gilbert cell mixers are used.

As the first, second, and third frequency dividers for generating reception local signals having a phase difference of 90°, ECL-like D-type flip flops are cascaded in two or four stages. The D-type flip flop is constructed by a sampling stage and a latch stage. The sampling stage includes a first MOS transistor having a gate to which a non-inversion clock CLK is supplied and having a source coupled to the ground voltage via a current source. The latch stage includes a second MOS transistor having a gate to which an inversion clock /CLK is supplied and having a source coupled to the ground voltage via the current source. The sampling stage also includes third and fourth MOS transistors having gates to which a non-inversion input signal D and an inversion input signal /D are supplied and having sources commonly coupled to the drain of the first MOS transistor. The drains of the third and fourth MOS transistors are coupled to the power source voltage via resistors. The latch stage further includes fifth and sixth MOS transistors whose gates are coupled to the drains of the fourth and third MOS transistors in the sampling stage, and whose sources are commonly coupled to the drain of the second MOS transistor. The drain of the third MOS transistor in the sampling stage, the drain of the fifth MOS transistor in the latch stage, and the gate of the sixth MOS transistor are commonly coupled to a non-inversion output terminal Q. The drain of the fourth MOS transistor in the sampling stage, the drain of the sixth MOS transistor in the latch stage, and the gate of the fifth MOS transistor are commonly coupled to an inversion output terminal /Q. ECL stands for an emitter coupled logic as a high-speed bipolar logic circuit.

Patent document 2 described below discloses a multiband transceiver having a plurality of voltage-controlled oscillators, a transmission/reception mixer unit, and a modulator/demodulator. In the configuration, a plurality of voltage-controlled oscillators adapted to bands of different oscillation frequencies are disposed. By outputting a switching instruction according to a desired frequency band from a controller, the voltage-controlled oscillators are switched to support multiband transmission/reception.

[Non-patent Document 1]
D. L. Kaczman et al, "A Single-Chip Tri-Band (2100, 1900, and 850/800 MHz) WCDMA/HSDPA Cellular Transceiver", IEEE Journal of Solid-State Circuits, Vol. 41, No. 5, May 2006, pp. 1122-1132
[Non-patent Document 2]
Chun-Lin Ko et al, "A CMOS Dual-Mode RF Front-End Receiver for GSM and WCDMA", 2004 IEEE Asia-Pacific Conference on Advanced System Integrated Circuit (AP-ASIC2004), Aug. 4 and 5, 2004, pp. 374-377
[Patent Document 1]
Japanese Unexamined Patent Publication No. 2002-280924
[Patent Document 2]
Japanese Unexamined Patent Publication No. 2000-269848

SUMMARY OF THE INVENTION

Prior to the present invention, the inventors of the present invention engaged in research and development of a communication Radio Frequency Integrated Circuit (RFIC) capable of performing WCDMA/multiband communication. As a transmitter of the RFIC for communication, employment of direct up-conversion architecture was examined.
<<RFIC Examined Prior to Present Invention>>

FIG. 2 is a diagram showing a WCDMA/multiband direct up-conversion transmitter of the RFIC for communication examined prior to the present invention. Transmission frequency of transmission band I is 1920 to 1980 MHz, transmission frequency of transmission band VI is 830 to 840 MHz, transmission frequency of the transmission band II is 1850 to 1910 MHz, and transmission frequency of transmission band XI is 1428 to 1453 MHz. The transmission bands I, VI, II, and XI are used for transmission from transmission blocks Tx_Blk1, Tx_Blk2, Tx_Blk3, and Tx_Blk4 to a base station.

Digital baseband transmission signals DI and DQ supplied to digital I, Q signal input terminals 26 and 27 in FIG. 2 are converted to analog signals by D/A converters 22 and 25, respectively. The analog signals are amplified by variable gain amplifiers 21 and 24, and unnecessary signals are eliminated by low-pass filters 20 and 23. Analog baseband transmission signals from the low-pass filters 20 and 23 are supplied to one of input terminals of a pair of mixers 9 and 10 constructing an I/Q modulator disposed in each of the transmission blocks Tx_Blk1, Tx_Blk2, Tx_Blk3, and Tx_Blk4 corresponding to the different bands. The variable gain amplifiers 21 and 24 can be replaced by fixed gain amplifiers. From a band selector 15, a transmission block selection signal Tx_Blk_SS for on/off controlling the transmission blocks Tx_Blk1, Tx_Blk2, Tx_Blk3, and Tx_Blk4 is output.

In the RFIC, two voltage-controlled oscillators (VCO) 16 and 18 for transmission are disposed for generating transmission local signals. First, when the transmission bands I, VI, and II are selected, the voltage-controlled oscillator (TXVCOA) 16 for transmission oscillating at an oscillation frequency of 3320 to 3960 MHz is controlled to be on. When the transmission band XI is selected, the other voltage-controlled oscillator (TXVCOB) 18 for transmission oscillating at an oscillation frequency of 2856 to 2896 MHz is controlled to be on.

In the following, the operation performed when the transmission band I is selected will be described. At this time, only the transmission block Tx_Blk1 is on and the other transmission blocks Tx_Blk2, Tx_Blk3, and Tx_Blk4 are in the off state. When the transmission band I is selected, the voltage-controlled oscillator (TXVCOA) 16 for transmission for the transmission block Tx_Blk1 is locked in the oscillation frequency band of 3840 to 3960 MHz by a PLL circuit 17. Therefore, to a frequency divider 11 in which the frequency dividing number is set to 2, a voltage-controlled oscillation signal for transmission of 3840 to 3960 MHz is supplied. From two output terminals of the frequency divider 11 in which frequency dividing ratio is set to 1/2, transmission local signals 32 and 33 of 1920 to 1980 MHz having a phase difference of 90 degrees ($\pi/2$) are supplied to the other input terminals of the pair of mixers 9 and 10. RF output signals of the pair of mixers 9 and 10 are synthesized. The resultant signals are amplified by a variable gain amplifier 7. An unnecessary signal is eliminated by a band pass filter 6, and the resultant signal is amplified by a power amplifier 5. The amplified signal is output as an RF transmission signal of the transmission band I of the transmission frequency of 1920 to 1980 MHz from a transmission terminal 28.

Next, the operation performed when the transmission band VI is selected will be described. At this time, only the transmission block Tx_Blk2 is on and the other transmission blocks Tx_Blk1, Tx_Blk3, and Tx_Blk4 are in the off state. When the transmission band VI is selected, the voltage-controlled oscillator (TXVCOA) 16 for transmission for the transmission block Tx_Blk2 is locked in the oscillation frequency band of 3320 to 3360 MHz by the PLL circuit 17. Therefore, to a frequency divider 12 in which the frequency dividing number is set to 4, a voltage-controlled oscillation signal for transmission of 3320 to 3360 MHz is supplied. From two output terminals of the frequency divider 12 in which frequency dividing ratio is set to 1/4, transmission local signals of 830 to 840 MHz having a phase difference of 90 degrees ($\pi/2$) are supplied to the other input terminals of the pair of mixers 9 and 10. RF output signals of the pair of mixers 9 and 10 are synthesized. The resultant signals are amplified by the variable gain amplifier 7. An unnecessary signal is eliminated by the band pass filter 6, and the resultant signal is amplified by the power amplifier 5. The amplified signal is output as an RF transmission signal of the transmission band VI of the transmission frequency of 830 to 840 MHz from a transmission terminal 29.

Next, the operation performed when the transmission band II is selected will be described. At this time, only the transmission block Tx_Blk3 is on and the other transmission blocks Tx_Blk1, Tx_Blk2, and Tx_Blk4 are in the off state. When the transmission band II is selected, the voltage-controlled oscillator (TXVCOA) 16 for transmission for the transmission block Tx_Blk3 is locked in the oscillation frequency band of 3700 to 3820 MHz by the PLL circuit 17. Therefore, to a frequency divider 13 in which the frequency dividing number is set to 2, a voltage-controlled oscillation signal for transmission of 3700 to 3820 MHz is supplied. From two output terminals of the frequency divider 13 in which frequency dividing ratio is set to 1/2, transmission local signals of 1850 to 1910 MHz having a phase difference of 90 degrees ($\pi/2$) are supplied to the other input terminals of the pair of mixers 9 and 10. RF output signals of the pair of mixers 9 and 10 are synthesized. The resultant signals are amplified by the variable gain amplifier 7. An unnecessary signal is eliminated by the band pass filter 6, and the resultant signal is amplified by the power amplifier 5. The amplified signal is output as an RF transmission signal of the transmission band II of the transmission frequency of 1850 to 1910 MHz from a transmission terminal 30.

Finally, the operation performed when the transmission band XI is selected will be described. At this time, only the transmission block Tx_Blk4 is on and the other transmission blocks Tx_Blk1, Tx_Blk2, and Tx_Blk3 are in the off state. When the transmission band XI is selected, the other voltage-controlled oscillator (TXVCOB) 18 for transmission for the transmission block Tx_Blk4 is locked in the oscillation frequency band of 2856 to 2906 MHz by the PLL circuit 17. Therefore, to a frequency divider 14 in which the frequency dividing number is set to 2, a voltage-controlled oscillation signal for transmission of 2856 to 2906 MHz is supplied. From two output terminals of the frequency divider 14 in which frequency dividing ratio is set to 1/2, transmission local signals of 1428 to 1453 MHz having a phase difference of 90 degrees ($\pi/2$) are supplied to the other input terminals of the pair of mixers 9 and 10. RF output signals of the pair of mixers 9 and 10 are synthesized. The resultant signals are amplified by the variable gain amplifier 7. An unnecessary signal is eliminated by the band pass filter 6, and the resultant signal is amplified by the power amplifier 5. The amplified signal is output as an RF transmission signal of the transmission band XI of the transmission frequency of 1428 to 1453 MHz from a transmission terminal 31.

<<Dual-Transmission Voltage-Controlled Oscillator>>

In the configuration of the direct up-conversion transmitter, quadrature local signals for the different bands are generated by the combination of the two voltage-controlled oscillators (VCO) 16 and 18 for transmission and the four frequency dividers 11, 12, 13, and 14. The frequency dividing numbers of the four frequency dividers 11, 12, 13, and 14 are 2 or 4, so that the frequency dividing ratio of the four frequency dividers 11, 12, 13, and 14 is either 1/2 or 1/4. Generally, when the frequency dividing number of a frequency divider is an even number, the phase difference of two output signals can be set to 90 degrees ($\pi/2$), and quadrature (orthogonal) local signals can be generated. For the above reason, in the transmitter of FIG. 2, in a manner similar to the non-patent document 1, the frequency dividing number of each of the four frequency dividers 11, 12, 13, and 14 is set to either 2 or 4. By limiting selection of the frequency dividing numbers of the four frequency dividers to the even numbers of 2 and 4, the frequency band of a local signal which can be generated from a voltage-controlled oscillator (VCO) whose oscillation frequency range is limited is also limited.

For such a reason, to improve the flexibility in selection of the frequency of the transmission local signal, the band of the oscillation frequency of the voltage-controlled oscillator (VCO) is broadened or, as described in the patent document 2, a plurality of voltage-controlled oscillators (VCO) have to be disposed in each of the bands.

FIG. 3 is a diagram showing the relation between the oscillation frequency band of the voltage-controlled oscillator (VCO) and the local signal frequency band in the transmitter shown in FIG. 2.

As shown in the upper right box in FIG. 3, the oscillation frequency band of the voltage-controlled oscillator (TXVCOA) 16 for transmission is set to 3320 to 3960 MHz so that the oscillation frequency band is not broadened excessively. In the lower right box in FIG. 3, to generate quadrature local signals for transmission by using a 1/2 frequency divider also in the transmission band XI, the other voltage-controlled oscillator (TXVCOB) 18 for transmission whose oscillation frequency band is set to 2856 to 2906 MHz is added. Consequently, in the RFIC for communication examined prior to the present invention of FIG. 2, due to the addition of the other voltage-controlled oscillator (TXVCOB) 18, there is a problem such that the RFIC chip area is large and the manufacture cost of the RFIC is high.

<<Single Voltage-Controlled Oscillator for Transmission>>

FIG. 5 is a diagram showing a WCDMA/multiband direct up-conversion transmitter of another RFIC for communication examined prior to the present invention in a manner similar to FIG. 2. In the RFIC of FIG. 5, a single voltage-controlled oscillator (TXVCOC) 34 for transmission in which the oscillation frequency band is set to an extremely wide band of 2856 to 3960 MHz covers the WCDMA/multiband communication. In FIG. 5, the same reference numerals are designated to parts having the same functions as those of FIG. 2, and repetitive description will not be given.

FIG. 4 is a diagram showing the relation between the oscillation frequency band of the voltage-controlled oscillator (VCO) and the local signal frequency band in the transmitter shown in FIG. 5.

A transmitter system of FIG. 5 is constructed by a single voltage-controlled oscillator (VCO) for transmission covering the WCDMA/multiband communication different from the dual voltage-controlled oscillator (VCO) of the transmitter system of FIG. 2. In the transmitter system of FIG. 5, however, the oscillation frequency band of a single voltage-controlled oscillator (TXVCOC) 34 for transmission is set to be extremely wide like 2856 to 3960 MHz, and the fractional bandwidth of the oscillation frequency is 27.9%.

In the transmitter system of FIG. 5, by employing the single voltage-controlled oscillator (TXVCOC) 34 for transmission, the RFIC chip area and the manufacture cost of the RFIC can be reduced. However, a problem such that phase noise increases as the oscillation frequency of the single voltage-controlled oscillator for transmission is widened was brought out by examinations of the inventors of the present invention.

The present invention has been achieved as a result of the examinations of the inventors of the present invention prior to the present invention.

Therefore, an object of the present invention is to provide a transceiver realizing suppression of increase in the number of multiband transmission/reception communication voltage-controlled oscillators or broadening of the band of a voltage-controlled oscillator for communication and increase in phase noise accompanying the broadening of the band.

The above and other objects and novel features of the present invention will become apparent from the description of the specification and the appended drawings.

Outline of representative ones of the inventions disclosed in the application will be briefly described as follows.

A representative transceiver of the present invention includes a voltage-controlled oscillator (34) for communication and a plurality of communication blocks (Tx_Blk1, Tx_Blk2, Tx_Blk3, and Tx_Blk4) for transmitting/receiving RF signals in a plurality of frequency bands. Each of the plural communication blocks includes frequency dividers (11, 12, 13, and 14) and mixers (9 and 10).

In each of the plural transmission blocks, the frequency divider supplies a pair of communication local signals generated by dividing a communication oscillation output signal supplied from the voltage-controlled oscillator (34) for communication to the mixers (9 and 10).

The frequency dividing number of one of the frequency dividers (11, 12, and 13) included in at least one of the plural communication blocks (Tx_Blk1, Tx_Blk2, and Tx_Blk3) is set to an even-numbered integer. By the setting, communication local signals supplied from the frequency divider included in the at least one communication block to the mixer become quadrature local signals substantially having a phase difference of 90 degrees.

Another frequency dividing number of another frequency divider (14) included in another communication block (Tx_Blk4) in the plural communication blocks is set to a non-integer. By the setting, communication local signals supplied from the frequency divider (14) included in the another transmission block (Tx_Blk4) to the mixer become non-quadrature local signals having a phase difference at a predetermined offset angle from 90 degrees.

The transceiver further includes a converting unit (35) for giving a compensation offset amount having almost the same absolute value and having a polarity opposite to that of the offset angle to a pair of communication analog signals related to the mixers (9 and 10) included in the another communication block (Tx_Blk4) (refer to FIG. 1).

An effect which can be obtained by the representative one of the inventions disclosed in the application will be briefly described as follows.

According to the present invention, increase in the number of multiband transmission/reception communication voltage-controlled oscillators or broadening of the band of the voltage-controlled oscillator for communication and increase in phase noise accompanying the broadening of the band can be suppressed.

BRIEF DESCRIPTION OF THE DRAWINGS

FIG. 3 is a diagram showing the relation of frequencies in different modes of the transmitter illustrated in FIG. 2.

FIG. 4 is a diagram showing the relation of frequencies in different modes of a transmitter illustrated in FIG. 5.

FIG. 6 is a diagram showing the relation of frequencies in different modes of the transmitter illustrated in FIG. 1.

FIG. 11 is a diagram showing the relation of frequencies in different modes of the receiver illustrated in FIG. 10.

FIG. 14 is a diagram showing the relation of frequencies in different modes of the transceiver illustrated in FIG. 13.

FIG. 15 is a diagram showing the relation of frequencies in different modes of the transceiver illustrated in FIG. 13.

FIG. 16 is a diagram showing the relation of frequencies in different modes of the transceiver illustrated in FIG. 13.

DETAILED DESCRIPTION OF THE PREFERRED EMBODIMENTS

1. Summary of the Preferred Embodiments

Figure 1:
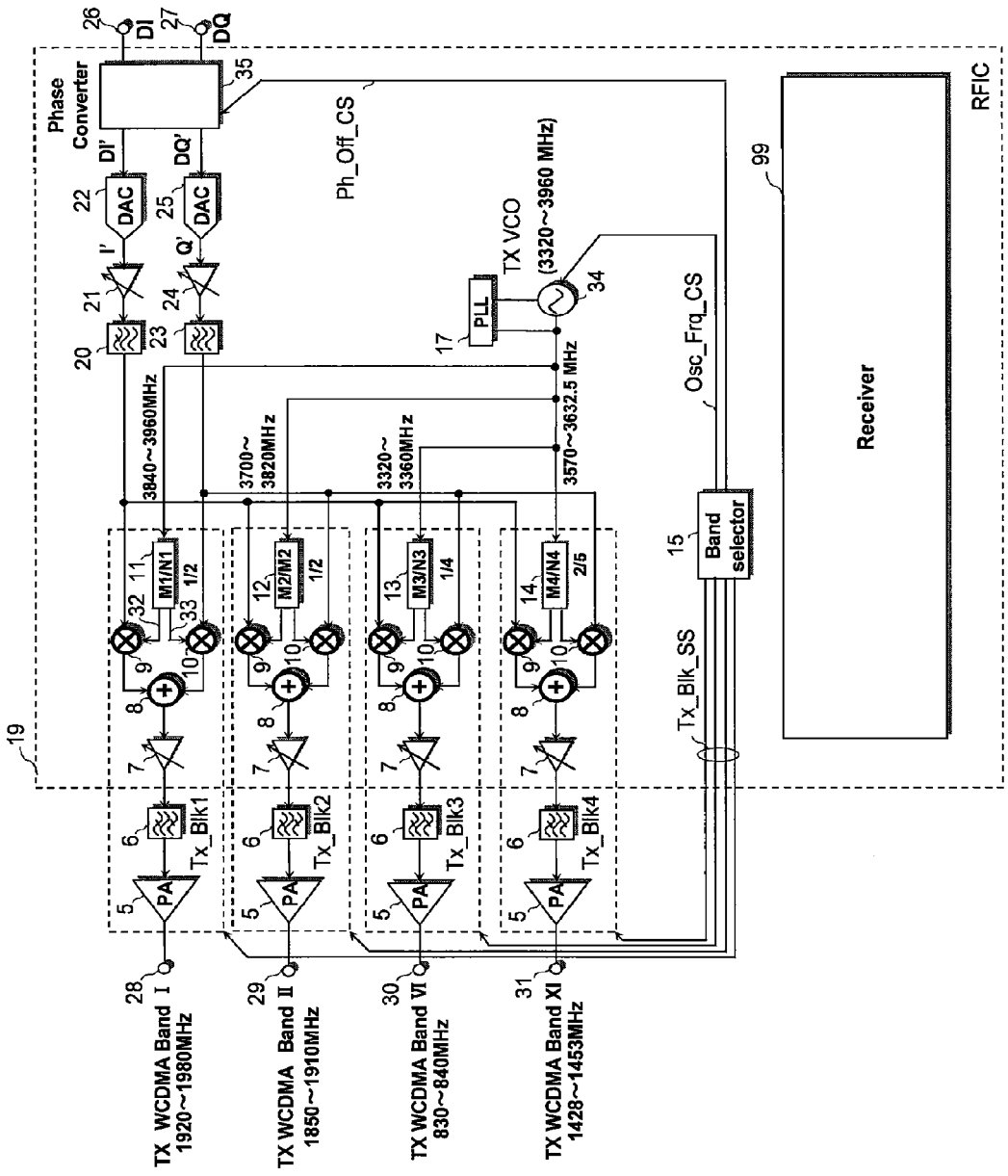
FIG. 1 is a diagram showing a direct up-conversion transmitter of a multimode/multiband communication RFIC as an embodiment of the present invention.

First, summary of the preferred embodiments of the present invention disclosed in the application will be described. Reference numerals in the drawings which are referred to in parentheses in the description of the summary of the preferred embodiments just show elements included in the concept of the elements.

(1) A transceiver (19) as a representative embodiment of the present invention has a receiver (99) and a transmitter.

The receiver (99) includes a reception demodulator for down-converting an RF reception signal to a reception analog signal.

The transmitter includes a voltage controlled oscillator (34) for transmission and a plurality of transmission blocks (Tx_Blk1, Tx_Blk2, Tx_Blk3, and Tx_Blk4) for generating RF transmission signals of a plurality of frequency bands.

Each of the plural transmission blocks includes a frequency divider (11, 12, 13, or 14) and a modulator for transmission (8, 9, and 10).

In each of the plural transmission blocks, the frequency divider supplies a pair of transmission local signals generated by dividing a transmission oscillation output signal supplied from the voltage-controlled oscillator (34) for transmission to the modulator for transmission (8, 9, and 10).

In each of the plural transmission blocks, the modulator for transmission up-converts a transmission analog signal to an RF transmission signal by the pair of transmission local signals supplied from the frequency divider.

Frequency dividing number of at least one frequency divider (11, 12, or 13) included in at least one transmission block (Tx_Blk1, Tx_Blk2, or Tx_Blk3) of the plural transmission blocks is set to an even-numbered integer.

By setting the frequency dividing number to the even-numbered integer, the corresponding pair of transmission local signals supplied from the at least one frequency divider included in the at least one transmission block to the corresponding transmission modulator become quadrature local signals substantially having a phase difference of 90 degrees.

Another frequency dividing number of the another frequency divider (14) included in the another transmission block (Tx_Blk4) in the plural transmission blocks is set to a non-integer.

By setting the another frequency dividing number to the non-integer, the another pair of transmission local signals supplied from the another frequency divider (14) included in the another transmission block (Tx_Blk4) to the other transmission modulators (8, 9, and 10) become non-quadrature local signals having a phase difference at a predetermined offset angle from 90 degrees.

The transmitter is characterized by further including a converting unit (35) for giving a compensation offset amount having almost the same absolute value and having a polarity opposite to that of the offset angle to a pair of transmission analog signals supplied to the another transmission modulator included in the another transmission block (Tx_Blk4) (refer to FIG. 1).

In the embodiment, the following operation is executed in the transmission modulators (8, 9, and 10) included in the another transmission block (Tx_Blk4) for generating RF transmission signals in a specific frequency band. In the transmission modulator, the offset angle of the pair of non-quadrature local signals for transmission is cancelled by the compensation offset amount given to the pair of non-quadrature transmission analog signals by the converting unit (35). As a result, ideal quadrature (orthogonal) modulation is performed in the transmission modulators (8, 9, and 10), and up-conversion from the transmission analog signal to an RF transmission signal in a specific frequency band can be executed. Increase in the number of voltage-controlled oscillators for transmission or broadening of the band of the voltage-controlled oscillator for transmission, and increase in phase noise accompanying the broadening can be suppressed.

In a preferred embodiment, the transmitter further includes a pair of D/A converters (22 and 25) for converting a pair of transmission digital signals to the pair of transmission analog signals, and the pair of D/A converters (22 and 25) are shared by the plural transmission blocks (Tx_Blk1, Tx_Blk2, Tx_Blk3, and Tx_Blk4) (refer to FIG. 1).

In the preferred embodiment, digital transmission interface between the transmitter and the baseband processing unit is realized. The influence of interference of the RF signal in the transmission interface can be lessened. Since the pair of D/A converters (22 and 25) are shared by the plural transmission blocks (Tx_Blk1, Tx_Blk2, Tx_Blk3, and Tx_Blk4), the cost of the transmitter can be reduced.

In another preferred embodiment, the converting unit (35) is coupled to a pair of input terminals of the pair of D/A converters (22 and 25). The converting unit (35) performs a digital signal process on the pair of transmission digital signals, thereby generating the pair of transmission analog signals to which the compensation offset amount is given from a pair of output terminals of the pair of the D/A converters (22 and 25) (refer to FIG. 1).

In the another preferred embodiment, the offset compensation can be realized with high precision by the digital signal process.

In further another preferred embodiment, the converting unit (36) is coupled to a pair of output terminals of the pair of D/A converters (22 and 25). The converting unit (36) performs an analog signal process on a pair of transmission input analog signals, thereby generating a pair of transmission analog output signals to which the compensation offset amount is given from a pair of output terminals of the converting unit (36) (refer to FIG. 7).

In the further another preferred embodiment, offset compensation can be easily realized by the analog signal process.

In a more preferred embodiment, frequency dividing numbers of a first frequency divider (11) and a second frequency divider (13) included in a first transmission block (Tx_Blk1) and a second transmission block (Tx_Blk3) included in the at least one transmission block are set to 2 and 4, respectively.

The frequency dividing number of the another frequency divider (14) included in the another transmission block (Tx_Blk4) is set to a non-integer which is 2.5.

Frequency of the transmission oscillation output signal generated from the voltage-controlled oscillator (34) for transmission can be set between about 3 GHz to about 4 GHz.

The first transmission block generates an RF transmission signal of a transmission band from about 1.8 GHz to about 2

GHz, the second transmission block generates an RF transmission signal of a transmission band of about 0.8 GHz, and the other transmission blocks generate an RF transmission signal of a transmission band of about 1.4 GHz (refer to FIG. 6).

In a concrete embodiment, the transmitter including the voltage-controlled oscillator (34) for transmission and the plural transmission blocks (Tx_Blk1, Tx_Blk2, Tx_Blk3, and Tx_Blk4) is either a direct up-conversion transmitter architecture or a low IF up-conversion transmitter architecture.

In a more concrete embodiment, the transmitter including the voltage-controlled oscillator for transmission and the plural transmission blocks is constructed in a semiconductor chip.

(2) A representative transceiver (19) of the present invention as a representative embodiment of the present invention has a receiver and a transmitter (100).

The transmitter (100) includes a transmission modulator for up-converting a transmission analog signal to an RF transmission signal.

The receiver includes a voltage-controlled oscillator (75) for reception and a plurality of reception blocks (Rx_Blk1, Rx_Blk2, Rx_Blk3, and Rx_Blk4) for receiving RF reception signals of a plurality of frequency bands.

Each of the plural reception blocks includes a frequency divider (62, 63, 64, or 65) and a demodulator for reception (60 and 61).

In each of the plural reception blocks, the frequency divider supplies a pair of reception local signals generated by dividing a reception oscillation output signal supplied from the voltage-controlled oscillator (75) for reception to the demodulator for reception (60 and 61).

In each of the plural reception blocks, the modulator for reception down-converts an RF transmission signal to a reception analog signal by the pair of reception local signals supplied from the frequency divider.

Frequency dividing number of at least one frequency divider (62, 63, or 64) included in at least one reception block (Rx_Blk1, Rx_Blk2, or Rx_Blk3) of the plural reception blocks is set to an even-numbered integer.

By setting the frequency dividing number to the even-numbered integer, the corresponding pair of reception local signals supplied from the at least one frequency divider included in the at least one reception block to the corresponding reception demodulator become quadrature local signals substantially having a phase difference of 90 degrees.

Another frequency dividing number of the another frequency divider (65) included in the another reception block (Rx_Blk4) of the plural reception blocks is set to a non-integer.

By setting the another frequency dividing number to the non-integer, the another pair of reception local signals supplied from the another frequency divider (65) included in the another reception block (Rx_Blk4) to the other reception demodulators (60 and 61) become non-quadrature local signals having a phase difference at a predetermined offset angle from 90 degrees.

Figure 10:
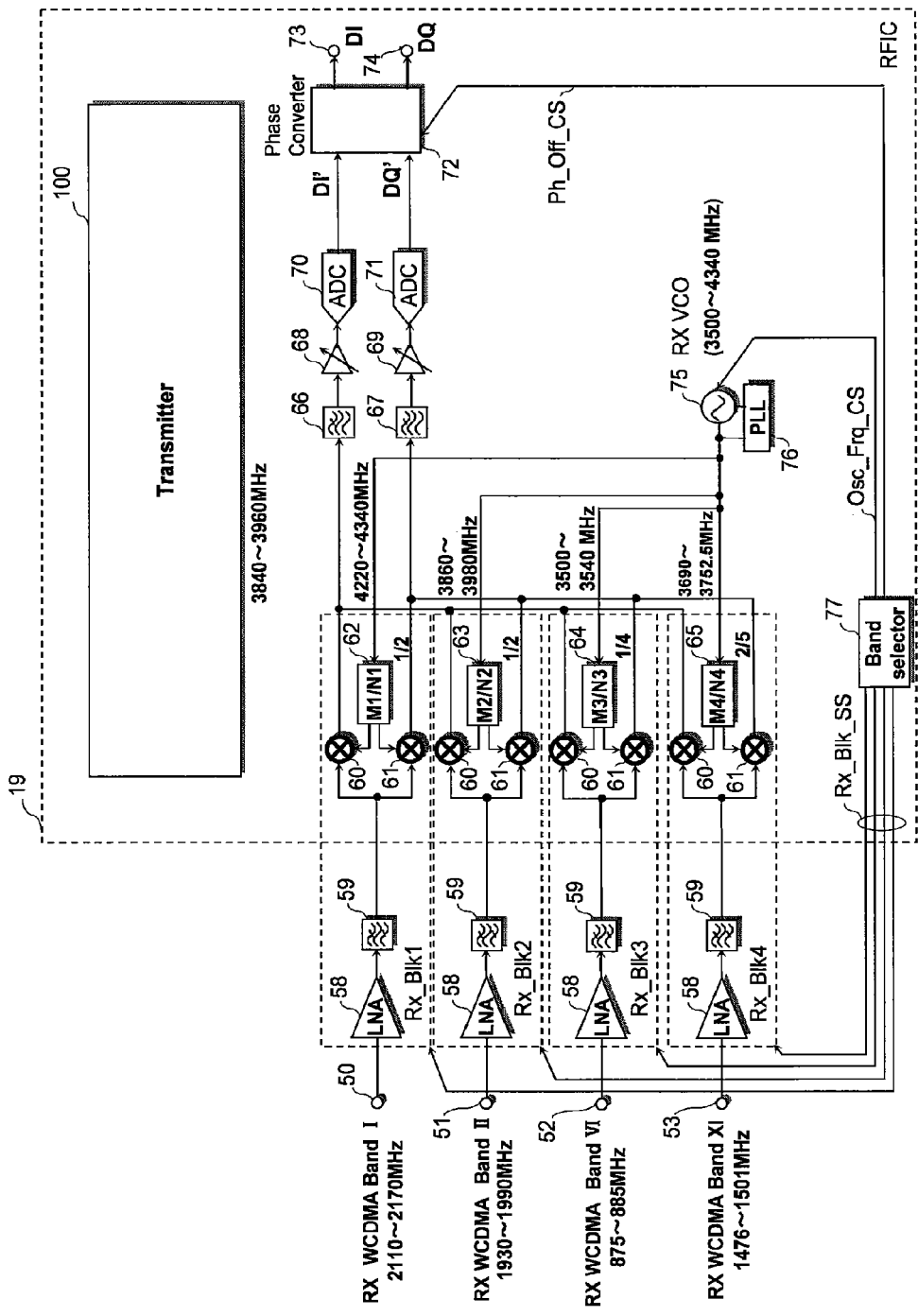
FIG. 10 is a diagram showing a direct down-conversion receiver of a multimode/multiband communication RFIC as an embodiment of the present invention.

The receiver is characterized by further including a converting unit (72) for giving a compensation offset amount having almost the same absolute value and having a polarity opposite to that of the offset angle to a pair of reception analog signals generated from the other reception demodulators included in the another reception block (Rx_Blk4) (refer to FIG. 10).

In the embodiment, the following operation is executed in the reception demodulators (60 and 61) included in the another reception block (Rx_Blk4) for generating an RF reception signal in a specific frequency band. Specifically, the influence of the offset angle of the pair of non-quadrature local signals for reception supplied to the reception demodulator is cancelled by the compensation offset amount given to the pair of reception analog signals generated from the reception demodulator by the converting unit (72). As a result, ideal quadrature (orthogonal) demodulation is performed in the another reception block (Rx_Blk4) in the receiver and the converting unit (72), and down-conversion from an RF reception signal in a specific frequency band to a reception analog signal can be executed. Increase in the number of voltage-controlled oscillators for reception or broadening of the band of the voltage-controlled oscillator for reception, and increase in accompanying phase noise can be suppressed.

In a preferred embodiment, the receiver further includes a pair of A/D converters (70 and 71) for converting the pair of reception analog signals to the pair of reception digital signals, and the pair of A/D converters (70 and 71) are shared by the plural reception blocks (Rx_Blk1, Rx_Blk2, Rx_Blk3, and Rx_Blk4) (refer to FIG. 10).

In the preferred embodiment, digital reception interface between the receiver and the baseband processing unit is realized. The influence of interference of the RF signal in the reception interface can be lessened. Since the pair of A/D converters (70 and 71) are shared by the plural reception blocks (Rx_Blk1, Rx_Blk2, Rx_Blk3, and Rx_Blk4), the cost of the receiver can be reduced.

In another preferred embodiment, the converting unit (78) is coupled to a pair of output terminals of the pair of A/D converters (70 and 71). The converting unit (72) performs a digital signal process on the pair of reception digital signals, thereby indirectly giving the compensation offset amount to the pair of reception analog signals from the reception demodulator (refer to FIG. 10).

In the another preferred embodiment, the offset compensation can be realized with higher precision by the digital signal process.

In further another preferred embodiment, the converting unit (78) is coupled to a pair of input terminals of the pair of A/D converters (70 and 71). The converting unit (78) performs an analog signal process on a pair of reception analog input signals, thereby directly giving the compensation offset amount to the pair of reception analog signals from the reception demodulator (refer to FIG. 12).

In the further another preferred embodiment, offset compensation can be more easily realized by the analog signal process.

In a more preferred embodiment, frequency dividing numbers of a first frequency divider (62) and a second frequency divider (64) included in a first reception block (Rx_Blk1) and a second reception block (Rx_Blk3) included in the at least one reception block are set to 2 and 4, respectively.

The frequency dividing number of the another frequency divider (65) included in the another reception block is set to a non-integer of 2.5.

The frequency of the reception oscillation output signal generated from the voltage-controlled oscillator (76) for reception can be set between about 3.5 GHz to about 4.5 GHz.

The first reception block receives an RF transmission signal of a reception band from about 1.9 GHz to about 2.2 GHz, the second reception block receives an RF reception signal of a reception band from about 0.8 GHz to about 0.9 GHz, and the other reception blocks receive an RF reception signal of a reception band from about 1.4 GHz to about 1.5 Hz.

In a concrete embodiment, the receiver including the voltage-controlled oscillator (76) for reception and the plural reception blocks (Rx_Blk1, Rx_Blk2, Rx_Blk3, and Rx_Blk4) is either a direct down-conversion receiver architecture or a low IF down-conversion receiver architecture.

As a most concrete embodiment, the receiver including the voltage-controlled oscillator for reception and the plural reception blocks is constructed in a semiconductor chip.

2. Further Detailed Description of the Preferred Embodiments

The embodiments will be described in more detail. A best mode for carrying out the invention will be described in detail with reference to the drawings. In all of the drawings for explaining the best mode for carrying out the invention, the same reference numerals are designated to members having the same function and their repetitive description will not be given.

<<Direct Up-Conversion Transmitter>>

FIG. 1 is a diagram showing a direct up-conversion (DUC) transmitter for multiband/multimode communication as an embodiment of the present invention.

<<Total System of RFIC>>

An RFIC (19) for communication in FIG. 1 has a transmitter and a receiver 99 disposed in upper and lower parts of a semiconductor chip. The transmitter in the upper part includes transmission modulators for converting a transmission analog baseband signal to an RF transmission signal in respective frequency bands of the RF transmission signal. The receiver 99 in the lower part includes reception demodulators for converting an RF reception signal to a reception analog baseband signal in respective frequency bands of the RF reception signal. The RFIC (19) includes, in the semiconductor chip, a digital phase converting unit 35, D/A converters 22 and 25, variable gain amplifiers 21 and 24, low-pass filters 20 and 23, a voltage-controlled oscillator (TXVCO) 34 for transmission, a transmission PLL circuit 17, and a transmission band selector 15.

Figure 2:
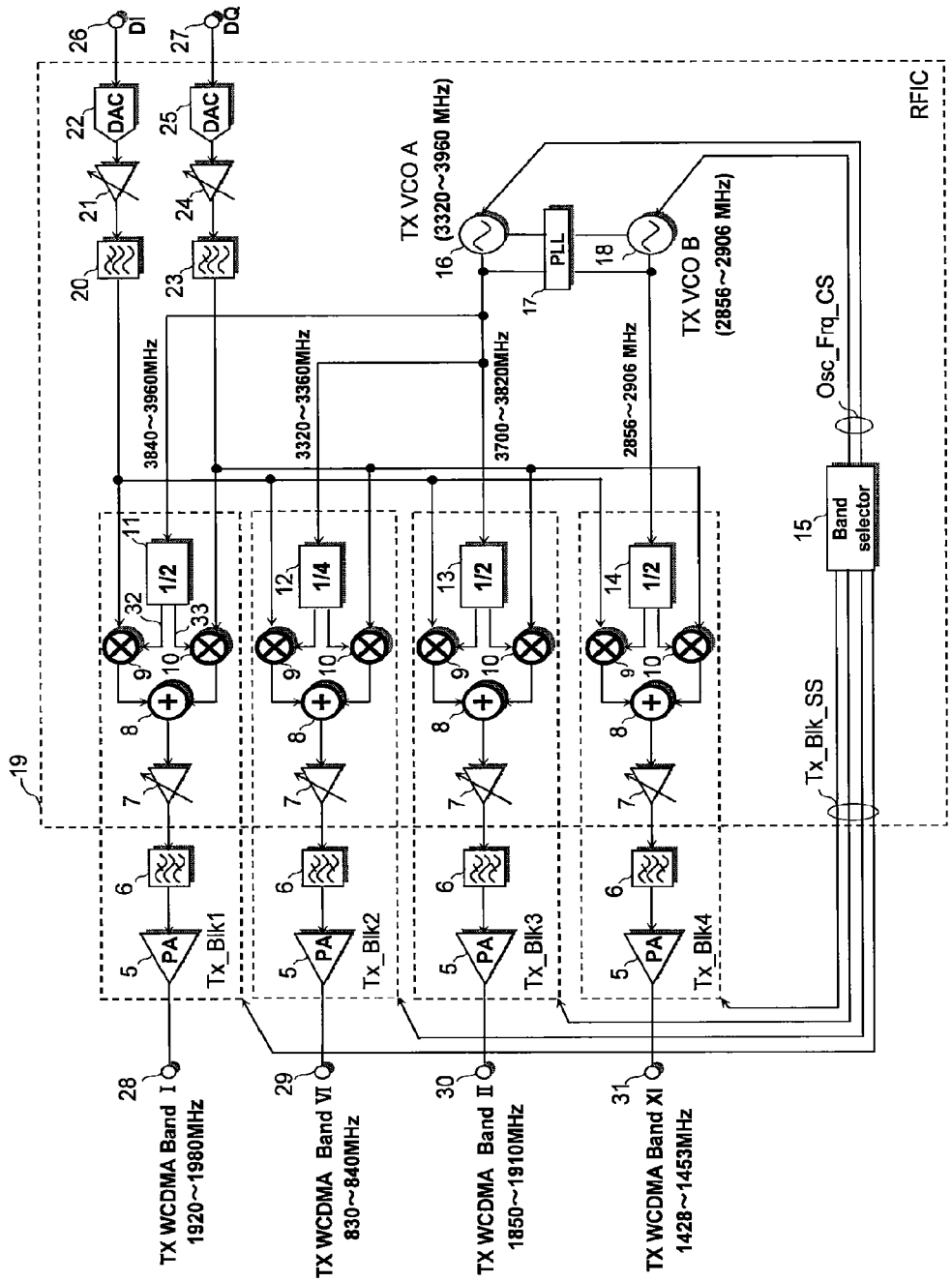
FIG. 2 is a diagram showing a direct up-conversion transmitter of a multimode/multiband communication RFIC examined prior to the present invention.
Figure 5:
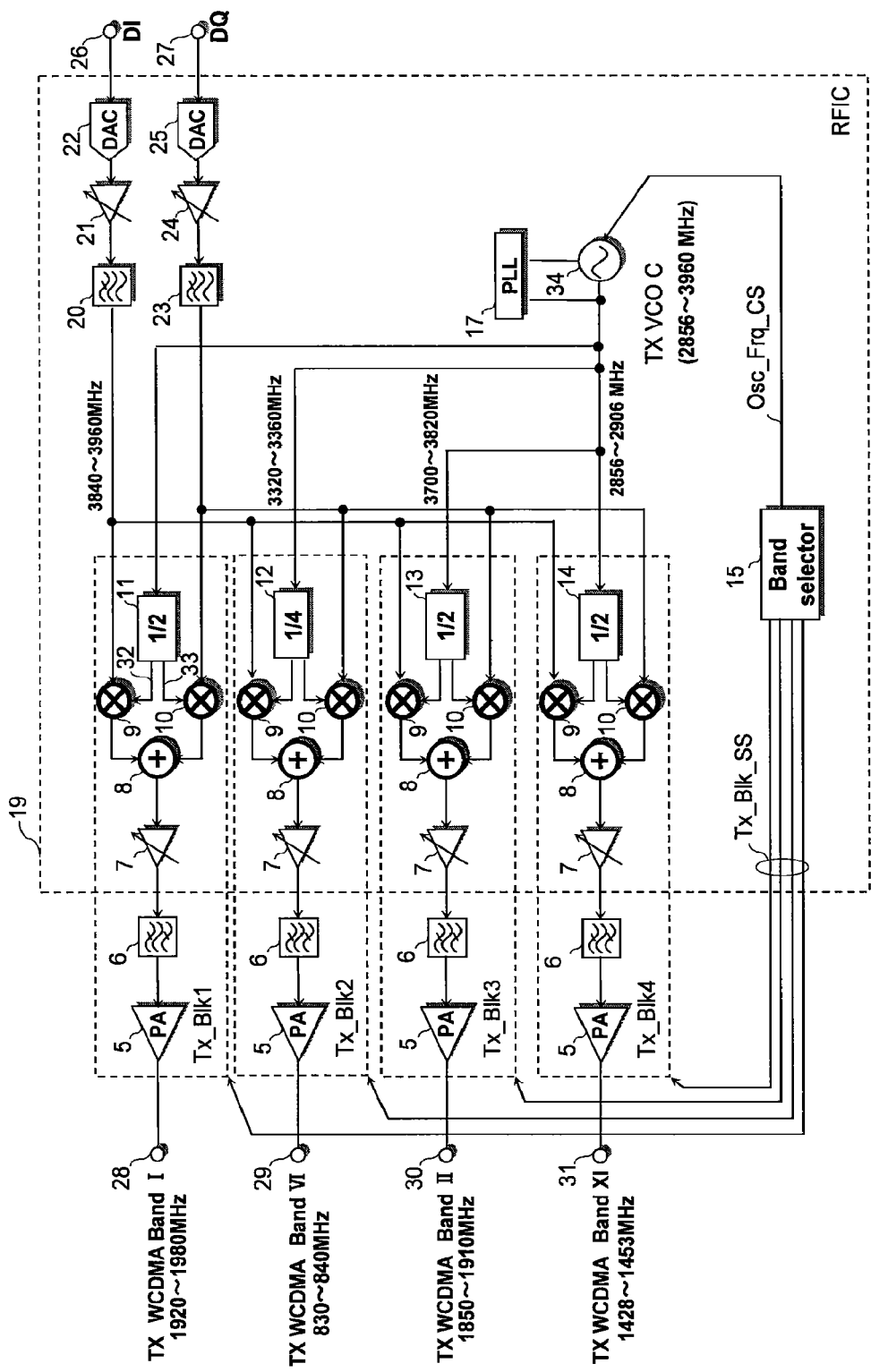
FIG. 5 is a diagram showing a direct up-conversion transmitter of another method of a multimode/multiband communication RFIC examined prior to the present invention.

In a manner similar to FIG. 2, the transmitter in the upper part of the RFIC (19) in FIG. 1 can perform multiband transmission in the transmission band I of transmission frequencies 1920 to 1980 MHz, transmission band II of transmission frequencies 1850 to 1910 MHz, transmission band VI of transmission frequencies 830 to 840 MHz, and transmission band XI of transmission frequencies 1428 to 1453 MHz. The transmission bands I, II, VI, and XI are used for transmission from transmission blocks Tx_Blk1, Tx_Blk2, Tx_Blk3, and Tx_Blk4 to a base station, respectively.

Each of the transmission blocks Tx_Blk1, Tx_Blk2, Tx_Blk3, and Tx_Blk4 includes a transmission quadrature modulator constructed by a pair of mixers 9 and 10 and an adder 8, a variable gain amplifier 7, a band pass filter 6, a power amplifier 5, and an M/N frequency divider 11, 12, 13, or 14. The band bass filter 6 and the power amplifier 5 in each of the transmission blocks Tx_Blk1, Tx_Blk2, Tx_Blk3, and Tx_Blk4 are constructed as external parts of the semiconductor chip of the RFIC (19). The frequency dividing ratio M/N of each of the M/N frequency dividers 11, 12, 13, and 14 is set so that M is a natural number satisfying the relation of M≧1, and N is a natural number satisfying the relation of N≧2.

<<Frequency Divider Whose Frequency Dividing Number is Set to Non-Integer for Transmitting Transmission Band XI>>

A frequency dividing ratio M4/N4 of the frequency divider 14 of the transmission block Tx_Blk4 for transmitting the transmission band XI of the transmission frequencies 1428 to 1453 MHz is set to 2/5, and the frequency dividing number is set to a non-integer of 2.5 which is the inverse number of the frequency dividing ratio. An oscillation output signal of the voltage-controlled oscillator (TXVCO) 34 for transmission which is set to an oscillation frequency in the range of 3570 to 3632.5 MHz by the band selector 15 and the PLL circuit 17 is divided by 2/5 as the frequency dividing ratio M4/N4 of the frequency divider 14 of the transmission block Tx_Blk4. From the transmission block Tx_Blk4, the transmission band XI of the transmission frequencies 1428 to 1453 MHz can be transmitted.

<<Frequency Dividers Whose Frequency Dividing Number is Set to Integer for Transmitting Other Transmission Bands>>

A frequency dividing ratio M1/N1 of the frequency divider 11 of the transmission block Tx_Blk1 for transmitting the transmission band I of the transmission frequencies 1920 to 1980 MHz is set to 1/2, and the frequency dividing number is set to an integer of 2 which is the inverse number of the frequency dividing ratio. An oscillation output signal of the voltage-controlled oscillator (TXVCO) 34 for transmission which is set to an oscillation frequency in the range of 3840 to 3960 MHz by the band selector 15 and the PLL circuit 17 is divided by 1/2 as the frequency dividing ratio M1/N1 of the frequency divider 11 of the transmission block Tx_Blk1. From the transmission block Tx_Blk1, the transmission band I of the 3GPP standard of transmission frequencies 1920 to 1980 MHz can be transmitted. 3GPP stands for 3rd Generation Partnership Project.

A frequency dividing ratio M2/N2 of the frequency divider 12 of the transmission block Tx_Blk2 for transmitting the transmission band II of the transmission frequencies 1850 to 1910 MHz is set to 1/2, and the frequency dividing number is set to an integer of 2 which is the inverse number of the frequency dividing ratio. An oscillation output signal of the voltage-controlled oscillator (TXVCO) 34 for transmission which is set to an oscillation frequency in the range of 3700 to 3820 MHz by the band selector 15 and the PLL circuit 17 is divided by 1/2 as the frequency dividing ratio M2/N2 of the frequency divider 12 of the transmission block Tx_Blk2. From the transmission block Tx_Blk2, the transmission band II of the 3GPP standard of the transmission frequencies 1850 to 1910 MHz can be transmitted.

A frequency dividing ratio M3/N3 of the frequency divider 13 of the transmission block Tx_Blk3 for transmitting the transmission band VI of the transmission frequencies 830 to 840 MHz is set to 1/4, and the frequency dividing number is set to an integer of 4 which is the inverse number of the frequency dividing ratio. An oscillation output signal of the voltage-controlled oscillator (TXVCO) 34 for transmission which is set to an oscillation frequency in the range of 3320 to 3360 MHz by the band selector 15 and the PLL circuit 17 is divided by 1/4 as the frequency dividing ratio M3/N3 of the frequency divider 13 of the transmission block Tx_Blk3. From the transmission block Tx_Blk3, the transmission band VI of the 3GPP standard of the transmission frequencies 830 to 840 MHz can be transmitted.

<<Frequency Dividers of Transmission Blocks>>

The transmission blocks Tx_Blk1, Tx_Blk2, Tx_Blk3, and Tx_Blk4 in the RFIC (19) in FIG. 1 have the frequency dividers 11, 12, 13, and 14, respectively, having the frequency dividing ratio M/N and whose frequency dividing number is the inverse number of the frequency dividing number as described above.

<<Frequency Divider of Frequency Dividing Number which is Integer>>

The frequency dividing ratio M1/N1 of the frequency divider 11 of the transmission block Tx_Blk1 for transmitting the transmission band I is set to 1/2, and the frequency dividing number is set to an integer of 2 which is the inverse number of the frequency dividing ratio. The frequency dividing ratio M2/N2 of the frequency divider 12 of the transmission block Tx_Blk2 for transmitting the transmission band II is set to 1/2, and the frequency dividing number is set to an integer of 2 which is the inverse number of the frequency dividing ratio. The frequency dividing ratio M3/N3 of the frequency divider 13 of the transmission block Tx_Blk3 for transmitting the transmission band VI is set to 1/4, and the frequency dividing number is set to an integer of 4 which is the inverse number of the frequency dividing ratio. The frequency dividing number of the frequency dividers 11, 12, and 13 of the transmission blocks Tx_Blk1, Tx_Blk2, and Tx_Blk3 for transmitting the transmission bands I, II, and VI is set to an even-numbered integer of 2 or 4.

A frequency divider whose frequency dividing number is an even number of 2 or 4 is constructed by cascade connection of ECL-like D-type flip flops in two or four stages as described in the non-patent document 2. From the frequency divider, a pair of quadrature local signals having a phase difference of 90 degrees can be generated.

The frequency divider whose frequency dividing number is an even number of 2 or 4 and generating a pair of quadrature local signals having a phase difference of 90 degrees as described in the non-patent document 2 can be used as the frequency dividers 11, 12, and 13 of the transmission blocks Tx_Blk1, Tx_Blk2, and Tx_Blk3 of the RFIC (19) of FIG. 1. The analog baseband transmission signals from the low-pass filters 20 and 23 are supplied to one of input terminals of the pair of mixers 9 and 10 constructing the I/Q modulator in each of the transmission blocks Tx_Blk1, Tx_Blk2, and Tx_Blk3. A pair of quadrature local signals having a phase difference of 90 degrees are supplied from outputs of the frequency dividers 11, 12, and 13 to the other input terminal of the pair of mixers 9 and 10 constructing the I/Q modulator in each of the transmission blocks Tx_Blk1, Tx_Blk2, and Tx_Blk3. As a result, quadrature (orthogonal) modulation for generating an RF transmission signal is performed in the I/Q modulators in the transmission blocks Tx_Blk1, Tx_Blk2, and Tx_Blk3. The RF transmission signals subjected to vector synthesis in the adder 8 are supplied to the variable gain amplifier 7, the band-pass filter 6, and the power amplifier 5.

<<Frequency Divider whose Frequency Dividing Number is Non-Integer>>

In contrast, the frequency dividing ratio M4/N4 of the frequency divider 14 of the transmission block Tx_Blk4 for transmitting the transmission band XI of the transmission frequencies 1428 to 1453 MHz is set to 2/5, and the frequency dividing number is set to a non-integer of 2.5 which is the inverse number of the frequency dividing ratio. Therefore, obviously, the frequency divider whose frequency dividing number is an even-numbered integer which is 2 or 4 described in the non-patent document 2 cannot be used as the frequency divider 14 of the transmission block Tx_Blk4 in the RFIC (19) in FIG. 1.

<<Phase Offset in Local Signal Due to Frequency Division of Non-Integer>>

As will be described in detail later, the frequency divider 14 whose frequency dividing number is a non-integer of 2.5 in the transmission block Tx_Blk4 in the RFIC (19) in FIG. 1 is a logic frequency divider having a complicated circuit configuration shown in FIG. 8. The logic frequency divider having the complicated circuit configuration of FIG. 8 generates a pair of local signals LI and LQ having a cycle of 2.5 times and a duty ratio of 40% in response to a clock input signal CLK supplied as shown in FIG. 9. However, the phase difference of the pair of local signals LI and LQ does not become 90 degrees but is M4·π/N4=180°/2.5=72°. A pair of non-quadrature local signals LI and LQ are generated. The pair of non-quadrature local signals LI and LQ having the phase difference of 72 degrees have an error offset angle of −18°(=72°−90° from the ideal phase difference of 90 degrees.

<<Compensation of Phase Converting Unit by Phase Converting Unit>>

At the time of transmission of the transmission band XI, a compensation phase offset amount in analog conversion in the digital phase converting unit 35 controlled by the band selector 15 is set to +18 degrees. That is, the error offset angle of the pair of non-quadrature local signals LI and LQ and the compensation phase offset amount in analog conversion in the digital phase converting unit 35 are adjusted so that their polarities are opposite to each other and their absolute values are almost the same.

To the pair of input terminals 26(DI) and 27(DQ) of the digital phase converting unit 35, a pair of digital baseband transmission input signals having a phase difference of 90 degrees in analog conversion are supplied from a not-shown baseband processing unit. Under control of the band selector 15, the digital phase converting unit 35 generates a pair of digital baseband transmission output signals having a phase difference of 108 degrees in analog conversion at a pair of output terminals DI' and DQ' in response to a pair of digital baseband transmission input signals of the pair of input terminals 26 (DI) and 27 (DQ).

The pair of digital baseband transmission output signals of the output terminals DI' and DQ' of the digital phase converting unit 35 are supplied to the input terminals of the D/A converters 22 and 25, and a pair of analog baseband transmission output signals having an analog phase difference of 108 degrees are generated from the output terminals of the D/A converters 22 and 25. The pair of analog baseband transmission output signals having the analog phase difference of 108 degrees are supplied to one of the input terminals of the pair of mixers 9 and 10 constructing the I/Q modulator in the transmission block Tx_Blk4 via the variable gain amplifiers 21 and 24 and the low-pass filters 20 and 23. On the other hand, to the other input terminal of the pair of mixers 9 and 10 constructing the I/Q modulator of the transmission block Tx_Blk4, a pair of non-quadrature local signals having the phase difference of 72 degrees are supplied from the frequency divider 14 whose frequency dividing number is set to a non-integer of 2.5. As a result, in the I/Q modulator in the transmission block Tx_Blk4, the error offset angle of −18° is canceled by the compensation phase offset amount of 18 degrees, and the quadrature (orthogonal) modulation for generating an RF transmission signal of the transmission band XI of the transmission frequencies 1428 to 1453 MHz is performed. Like in the transmission blocks Tx_Blk1, Tx_Blk2, and Tx_Blk3, the RF transmission signal of the transmission band XI subjected to vector synthesis in the adder 8 of the transmission block Tx_Blk4 is supplied to the variable gain amplifier 7, the band pass filter 6, and the power amplifier 5.

At the time of transmitting the transmission bands I, II, and VI, a pair of quadrature local signals having a phase difference of 90 degrees are supplied from the output of the frequency dividers 11, 12, and 14 whose frequency dividing number is set to an integer of 2 or 4 to the other input terminal of the pair of mixers 9 and 10 constructing the I/Q modulator in each of the transmission blocks Tx_Blk1, Tx_Blk2, and Tx_Blk3. Since the error offset angle is zero at this time, the band selector 15 controls the compensation phase offset amount in the digital phase converting unit 35 to zero degree.

FIG. 6 is a table of the oscillation frequency band of the voltage-controlled oscillator 34, RF transmission signal frequency band, the frequency dividing ratio of the frequency divider in each of the transmission blocks, and error offset angle of a pair of local signals in the transmitting operation of transmitting the transmission bands I, I, VI, and XI of the transmitter in the RFIC (19) for communication in FIG. 1.

<<Transmitter Including Analog Phase Converting Unit>>

Figure 7:
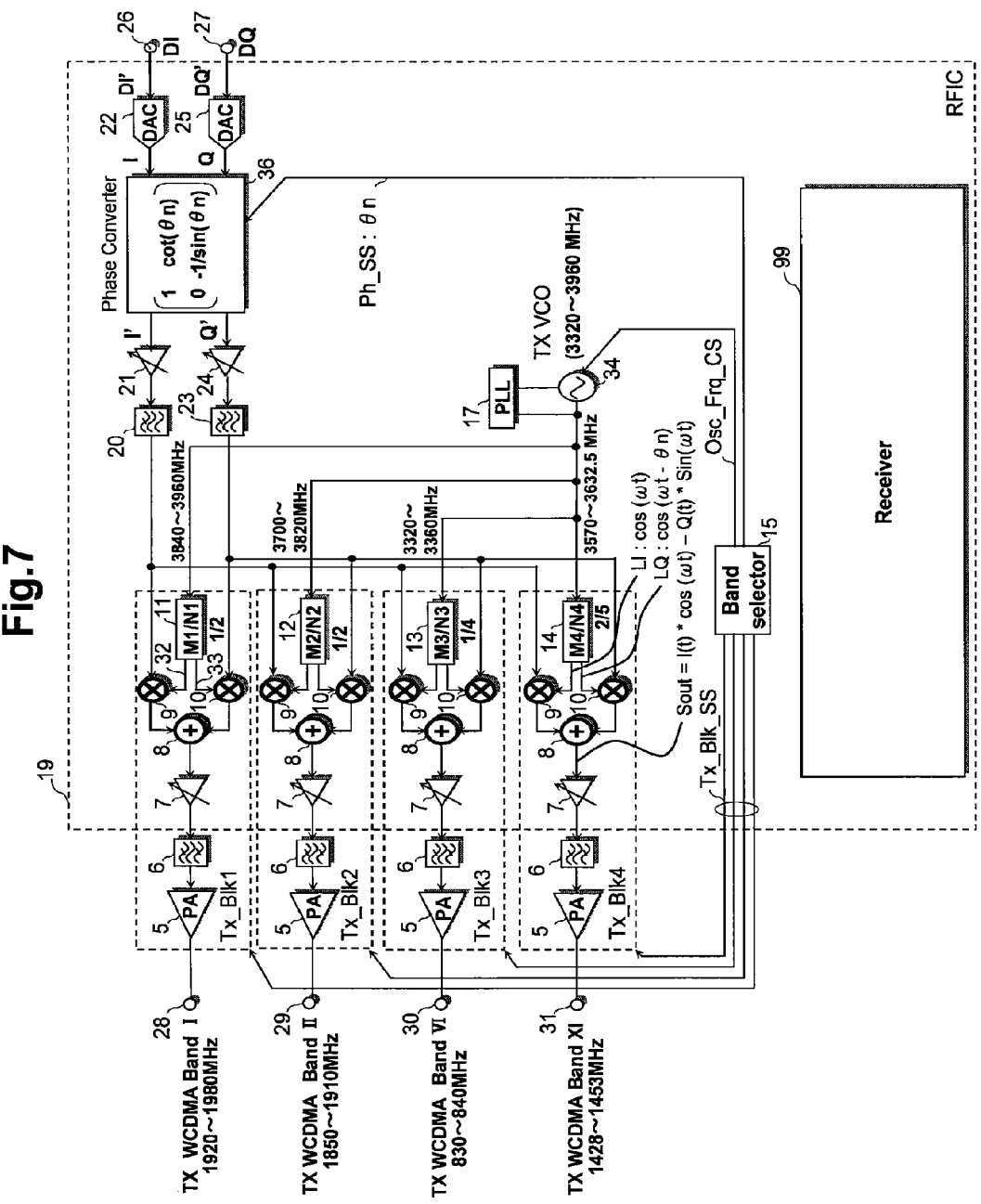
FIG. 7 is a diagram showing a direct up-conversion transmitter of a multimode/multiband communication RFIC as another embodiment of the present invention.

FIG. 7 is a diagram showing a direct up-conversion transmitter for multiband/multimode communication as another embodiment of the present invention.

In the transmitter in FIG. 7, in stead of deleting the digital phase converting unit 35 in the transmitter in FIG. 7, an analog phase converting unit 36 is coupled between output terminals of the D/A converters 22 and 25 and input terminals of the variable gain amplifiers 21 and 24.

In FIG. 7, digital baseband transmission signals DI(t) and DQ(t) having a phase difference of 90 degrees in analog conversion are supplied to the input terminals 26 and 27 of the D/A converters 22 and 25, and analog baseband transmission signals I(t) and Q(t) from outputs of the D/A converters 22 and 25 are supplied to the analog phase converting unit 36. The analog phase converting unit 36 executes matrix operation using the following matrix and the supplied analog baseband transmission signals I(t) and Q(t) to generate two phase conversion analog baseband transmission signals I'(t) and Q'(t).

$$\begin{pmatrix} I'(t) \\ Q'(t) \end{pmatrix} = \begin{bmatrix} 1 & \cot(\theta n) \\ 0 & -\dfrac{1}{\sin(\theta n)} \end{bmatrix} \times \begin{pmatrix} I(t) \\ Q(t) \end{pmatrix} \quad \text{Equation (1)}$$

A phase selection signal θn of the matrix is given by a calculating formula θn=180*M/N*A (A=1, 2, . . . ) where N/M denotes a frequency dividing ratio of the frequency dividers 11, 12, 13, and 14 included in the transmission blocks Tx_Blk1, Tx_Blk2, Tx_Blk3, and Tx_Blk4 selected by the transmission block selection signal in the band selector 15. The value of the phase selection signal θn is equal to the phase difference of the pair of transmission local signals from the frequency dividers 11, 12, 13, and 14, is equal to 90 degrees in the transmitting operation of transmitting the transmission bands I, II, and VI, and is equal to 108 degrees in the transmitting operation of transmitting the transmission band XI.

In the transmission blocks Tx_Blk1, Tx_Blk2, Tx_Blk3, and Tx_Blk4, analog multiplication between a phase conversion analog baseband transmission signal I' (t)=I(t)+cos(θn)·Q(t) and a transmission local signal LI(t)=cos(ωt) is performed in the mixer 9 as one of the mixers constructing the quadrature modulator for transmission. In the other mixer 10, analog multiplication between the other phase conversion analog baseband transmission signal Q' (t)=−Q(t)/sin(θn) and the other transmission local signal LQ(t)=cos(ωt−θn) is performed. As a result, an accurate quadrature modulation output signal can be obtained from the adder 8 coupled to the outputs of the mixers 1 and 2.

<<Logic Frequency Divider>>

Figure 8:
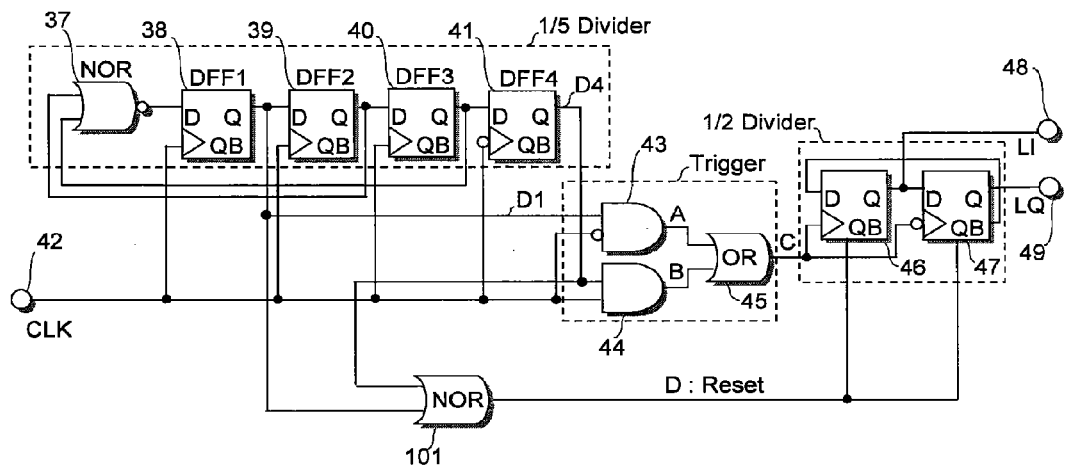
FIG. 8 is a diagram showing the configuration of a logic frequency divider whose frequency dividing number is a non-integer, included in a transmitter of a direct up-conversion architecture of the RFIC for communication as an embodiment of the present invention shown in FIG. 1.
Figure 9:
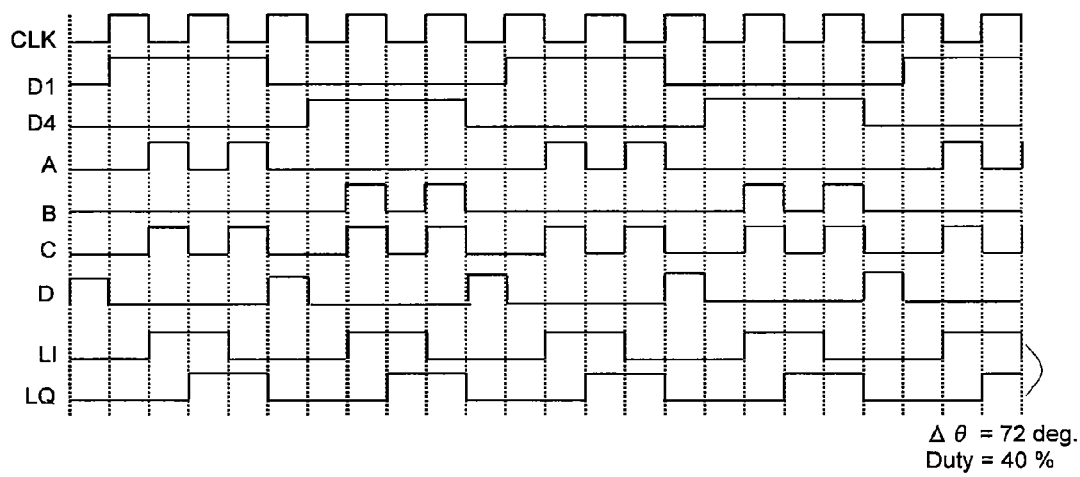
FIG. 9 is a diagram showing internal waveforms of the logic frequency divider illustrated in FIG. 8.

FIG. 8 is a diagram showing the configuration of a logic frequency divider whose frequency dividing number is a non-integer of 2.5, which is included in the transmitter of the direct up-conversion architecture in the RFIC for multiband/multimode communication as an embodiment of the present invention shown in FIG. 1. Therefore, the frequency dividing ratio of the logic frequency divider of FIG. 8 is 2/5 which is the inverse number of the frequency dividing number. FIG. 9 is a diagram showing waveforms in the logic frequency divider illustrated in FIG. 8.

The logic frequency divider of FIG. 8 includes a 1/5 frequency divider constructed by four D-type flip flops (FFs) 38, 39, 40, and 41 and a negative OR (NOR) circuit 37, a trigger signal generating unit constructed by two AND circuits 43 and 44 and an OR circuit 45, and a 1/2 frequency divider constructed by two D-type flip flops (FFs) 46 and 47.

To an input terminal 42 of the logic frequency divider, the clock input signal CLK is supplied from the voltage-controlled oscillator 34 for transmission. From the two D-type flip flops (FFs) 38 and 41 in the 1/5 frequency divider, a pair of signals D1 and D4 having a duty ratio of 40% are output at the frequency of 1/5 of the clock signal frequency. The phase difference between the 1/5 frequency divided signals D1 and D4 is 180 degrees, and the signals are supplied to the AND circuits 43 and 44 in the trigger signal generating unit. The AND circuit 43 calculates logical product A between the opposite phase of the clock input signal CLK and an output from the D-type flip flop (FF) 38 and supplies it to the OR circuit 45. The other AND circuit 44 calculates logical product B between the positive phase of the clock input signal CLK and an output from the D-type flip flop (FF) 41 and supplies the output to the OR circuit 45. OR of the output signals A and B of the AND circuits 43 and 44 is calculated by the OR circuit 45, and a trigger signal C to be supplied to the 1/2 frequency divider in the post stage is generated. The 1/2 frequency divider constructed by the two D-type flip flops (FFs) 46 and 47 generates a pair of local signals; an I-side local signal (LI) synchronized with a positive edge of the trigger signal (C) and a Q-side local signal (LQ) synchronized with a negative edge. A reset signal (D) computed from a negative OR of outputs of the two D-type flip flops (FFs) 38 and 41 is used as a reset signal of the 1/2 frequency divider. That is, the logic frequency divider having the complicated circuit configuration of FIG. 8 generates the pair of local signals LI and LQ having the cycle of 2.5 times in response to the clock input signal CLK supplied as shown in FIG. 9. The phase difference between the pair of local signals LI and LQ is not 90 degrees. A pair of non-quadrature local signals LI and LQ having a phase difference 72° (=M4·π/N4=180°/2.5) are generated.

As described above, by the logic frequency divider having the complicated circuit configuration shown in FIG. 8, the frequency divider 14 having the frequency dividing number of a non-integer of 2.5 in the transmission block Tx_Blk4 in the RFIC (19) in FIG. 1 can be constructed.

The present invention can be applied not only to the transmitter having the modulator including a pair of transmission mixers but also to a receiver having a demodulator including a pair of reception mixers as described below.

<<Direct Down-Conversion Receiver>>

FIG. 10 is a diagram showing a main part of a direct down-conversion (DDC) receiver of an RFIC for multiband/multimode communication as another embodiment of the present invention.

The RFIC (19) for communication in FIG. 10 has a transmitter 100 and a receiver disposed in upper and lower parts of a semiconductor chip. The transmitter 100 in the upper part includes transmission modulators for converting a transmission analog baseband signal to an RF transmission signal in respective frequency bands of the RF transmission signal. The receiver in the lower part includes reception demodulators for converting an RF reception signal to a reception analog baseband signal in respective frequency bands of the RF reception signal. The RFIC (19) includes, in the semiconductor chip, low-pass filters 66 and 67, variable gain amplifiers 68 and 69, A/D converters 70 and 71, a digital phase converting unit 72, a voltage-controlled oscillator (RXVCO) 75 for reception, a reception PLL circuit 76, and a reception band selector 77.

The receiver in the lower part of the RFIC (19) in FIG. 10 can perform multiband reception in the reception band I of reception frequencies 2110 to 2170 MHz, reception band II of reception frequencies 1930 to 1990 MHz, reception band VI of reception frequencies 875 to 885 MHz, and reception band XI of reception frequencies 1476 to 1501 MHz. The reception bands I, II, VI, and XI are received by reception blocks Rx_Blk1, Rx_Blk2, Rx_Blk3, and Rx_Blk4 from a base station, respectively.

Each of the reception blocks Rx_Blk1, Rx_Blk2, Rx_Blk3, and Rx_Blk4 includes a low noise amplifier 58, a band pass filter 59, a reception quadrature demodulator constructed by a pair of mixers 60 and 61, and an M/N frequency divider 62, 63, 64, or 65. The low noise amplifier 58 and the band bass filter 59 in each of the reception blocks Rx_Blk1, Rx_Blk2, Rx_Blk3, and Rx_Blk4 are constructed as external parts of the semiconductor chip of the RFIC (19). In another embodiment, they are formed in the semiconductor chip of the RFIC (19). The frequency dividing ratio M/N of each of the M/N frequency dividers 62, 63, 64, and 65 is set so that M is a natural number satisfying the relation of M≧1, and N is a natural number satisfying the relation of N≧2.

<<Frequency Divider Whose Frequency Dividing Number is Set to Non-Integer for Transmitting Reception Band XI>>

A frequency dividing ratio M4/N4 of the frequency divider 65 of the reception block Rx_Blk4 for receiving the transmission band XI of the transmission frequencies 1476 to 1501 MHz is set to 2/5, and the frequency dividing number is set to a non-integer of 2.5 which is the inverse number of the frequency dividing ratio. An oscillation output signal of the voltage-controlled oscillator (RXVCO) 75 for reception which is set to an oscillation frequency in the range of 3690 to 3752.5 MHz by the band selector 77 and the PLL circuit 76 is divided by 2/5 as the frequency dividing ratio M4/N4 of the frequency divider 65 of the reception block Rx_Blk4. From the reception block Rx_Blk4, the transmission band XI of the transmission frequencies 1476 to 1501 MHz can be received.

<<Frequency Dividers set to Integer Frequency Dividing Number for Receiving Other Reception Bands>>

A frequency dividing ratio M1/N1 of the frequency divider 62 of the reception block Rx_Blk1 for receiving the reception band I of the reception frequencies 2110 to 2170 MHz is set to 1/2, and the frequency dividing number is set to an integer of 2 which is the inverse number of the frequency dividing ratio. An oscillation output signal of the voltage-controlled oscillator (RXVCO) 75 for reception which is set to an oscillation frequency in the range of 4220 to 4340 MHz by the band selector 77 and the PLL circuit 76 is divided by 1/2 as the frequency dividing ratio M1/N1 of the frequency divider 62 of the reception block Rx_Blk1. In the reception block Rx_Blk1, the reception band I of the 3GPP standard of reception frequencies 2110 to 2170 MHz can be received.

A frequency dividing ratio M2/N2 of the frequency divider 63 of the reception block Rx_Blk2 for transmitting the reception band II of the reception frequencies 1930 to 1990 MHz is set to 1/2, and the frequency dividing number is set to an integer of 2 which is the inverse number of the frequency dividing ratio. An oscillation output signal of the voltage-controlled oscillator (RXVCO) 75 for reception which is set to an oscillation frequency in the range of 3860 to 3980 MHz by the band selector 77 and the PLL circuit 76 is divided by 1/2 as the frequency dividing ratio M2/N2 of the frequency divider 63 of the reception block Rx_Blk2. From the reception block Rx_Blk2, the reception band II of the 3GPP standard of the reception frequencies 1930 to 1990 MHz can be transmitted.

A frequency dividing ratio M3/N3 of the frequency divider 64 of the reception block Rx_Blk3 for transmitting the reception band VI of the reception frequencies 875 to 885 MHz is set to 1/4, and the frequency dividing number is set to an integer of 4 which is the inverse number of the frequency dividing ratio. An oscillation output signal of the voltage-controlled oscillator (TXVCO) 34 for transmission which is set to an oscillation frequency in the range of 3500 to 3540 MHz by the band selector 77 and the PLL circuit 76 is divided by 1/4 as the frequency dividing ratio M3/N3 of the frequency divider 64 of the reception block Rx_Blk3. From the reception block Rx_Blk3, the reception band VI of the 3GPP standard of the reception frequencies 875 to 885 MHz can be transmitted.

<<Frequency Dividers of Reception Blocks>>

The reception blocks Rx_Blk1, Rx_Blk2, Rx_Blk3, and Rx_Blk4 in the RFIC (19) in FIG. 10 have the frequency dividers 62, 63, 64, and 65, respectively, having the frequency dividing ratio M/N and whose frequency dividing number is the inverse number of the frequency dividing number as described above.

<<Frequency Divider of Frequency Dividing Number which is Integer>>

The frequency dividing ratio M1/N1 of the frequency divider 62 of the reception block Rx_Blk1 for receiving the reception band I is set to 1/2, and the frequency dividing number is set to an integer of 2 which is the inverse number of the frequency dividing ratio. The frequency dividing ratio M2/N2 of the frequency divider 63 of the reception block Rx_Blk2 for receiving the reception band II is set to 1/2, and the frequency dividing number is set to an integer of 2 which is the inverse number of the frequency dividing ratio. The frequency dividing ratio M3/N3 of the frequency divider 64 of the reception block Rx_Blk3 for receiving the reception band VI is set to 1/4, and the frequency dividing number is set to an integer of 4 which is the inverse number of the frequency dividing ratio. The frequency dividing number of the frequency dividers 62, 63, and 64 of the reception blocks Rx_Blk1, Rx_Blk2, and Rx_Blk3 for receiving the reception bands I, II, and VI is set to an even-numbered integer of 2 or 4.

A frequency divider whose frequency dividing number is an even number of 2 or 4 is constructed by cascade connection of ECL-like D-type flip flops in two or four stages as described in the non-patent document 2. From the frequency divider, a pair of quadrature local signals having a phase difference of 90 degrees can be generated.

The frequency divider whose frequency dividing number is an even number of 2 or 4 and generating a pair of quadrature local signals having a phase difference of 90 degrees as described in the non-patent document 2 can be used as the frequency dividers 62, 63, and 64 of the reception blocks Rx_Blk1, Rx_Blk2, and Rx_Blk3 of the RFIC (19) of FIG. 10. The RF reception signals from the low noise amplifier 58 and the band pass filter 59 are supplied to one of input terminals of the pair of mixers 60 and 61 constructing the I/Q demodulator in each of the reception blocks Rx_Blk1, Rx_Blk2, and Rx_Blk3. A pair of quadrature local signals having a phase difference of 90 degrees are supplied from outputs of the frequency dividers 11, 12, and 13 to the other input terminal of the pair of mixers 60 and 61 constructing the I/Q demodulator in each of the reception blocks Rx_Blk1, Rx_Blk2, and Rx_Blk3. Therefore, quadrature (orthogonal) demodulation for generating a pair of analog baseband reception signals having a phase difference of 90 degrees is performed in the I/Q demodulators in the reception blocks Rx_Blk1, Rx_Blk2, and Rx_Blk3. As a result, the pair of analog baseband reception signals are supplied via the low-pass filters 66 and 67 and the variable gain amplifiers 68 and 69 to the A/D converters 70 and 71.

<<Frequency Divider whose Frequency Dividing Number is Non-Integer>>

In contrast, the frequency dividing ratio M4/N4 of the frequency divider 65 of the reception block Rx_Blk4 for receiving the reception band XI of the reception frequencies 1476 to 1501 MHz is set to 2/5, and the frequency dividing number is set to a non-integer of 2.5 which is the inverse number of the frequency dividing ratio. Therefore, obviously, the frequency divider whose frequency dividing number is an even-numbered integer which is 2 or 4 described in the non-patent document 2 cannot be used as the frequency divider 65 of the reception block Rx_Blk4 in the RFIC (19) in FIG. 10.

However, like the frequency divider 14 of the transmission block Tx_Blk4 in the RFIC (19) in FIG. 1, the frequency divider 65 whose frequency dividing number is a non-integer of 2.5 in the reception block Rx_Blk4 in the RFIC (19) in FIG. 10 can be a logic frequency divider having a complicated circuit configuration shown in FIG. 8. The logic frequency divider having the complicated circuit configuration of FIG. 8 generates a pair of local signals LI and LQ having a cycle of 2.5 times in response to a clock input signal CLK supplied as shown in FIG. 9. However, the phase difference of the pair of local signals LI and LQ does not become 90 degrees but is M4·π/N4=180°/2.5=72°. A pair of non-quadrature local signals LI and LQ are generated. The pair of non-quadrature local signals LI and LQ having the phase difference of 72 degrees have an error offset angle of −18° (=72°−90°) from the ideal phase difference of 90 degrees.

Therefore, in FIG. 10, at the time of reception of the reception band XI, the phase difference of a pair of analog baseband reception signals obtained from outputs of the pair of mixers 60 and 61 constructing the I/Q demodulator in the reception block Rx_Blk4 does not become 90 degrees but is M4·π/N4=180°/2.5=72°. A pair of analog baseband reception signals having the phase difference of 72 degrees have an error offset angle of −18° (=72°−90°) from the ideal phase difference of 90 degrees.

<<Compensation of Phase Converting Unit by Phase Converting Unit>>

At the reception of the reception band XI, a compensation phase offset amount in analog conversion in the digital phase converting unit 72 controlled by the band selector 77 is set to +18 degrees. That is, the error offset angle of the pair of non-quadrature local signals LI and LQ and the compensation phase offset amount in analog conversion in the digital phase converting unit 72 are adjusted so that their polarities are opposite to each other and their absolute values are almost the same.

At the reception of the reception band XI, to the pair of input terminals DI' and DQ' of the digital phase converting unit 72 in the RFIC (19) of FIG. 10, a pair of digital reception baseband input signals having an error offset angle of −18° with respect to an ideal phase difference of 90 degrees in analog conversion are supplied via the A/D converters 70 and 71.

Therefore, in the digital phase converting unit 72, the error offset angle of −18 degrees is cancelled by the compensation phase offset amount of 18 degrees. As a result, the pair of digital reception baseband input signals having the ideal phase difference of 90 degrees in analog conversion obtained by down-converting the RF reception signal in the reception band XI of the reception frequencies 1476 to 1501 MHz can be generated at the pair of output terminals 73 (DI) and 74 (DQ) of the digital phase converting unit 72.

At the time of receiving the reception bands I, II, and VI, a pair of quadrature local signals having a phase difference of 90 degrees are supplied from the output of the frequency dividers 62, 63, and 64 whose frequency dividing number is set to an integer of 2 or 4 to the other input terminal of the pair of mixers 60 and 61 constructing the I/Q modulator in each of the reception blocks Rx_Blk1, Rx_Blk2, and Rx_Blk3. Since the error offset angle is zero at this time, the band selector 77 controls the compensation phase offset amount in the digital phase converting unit 72 to zero degree.

FIG. 11 is a table of the oscillation frequency band of the voltage-controlled oscillator 75, RF transmission signal frequency band, the frequency dividing ratio of the frequency divider in each of the reception blocks, and error offset angle of a pair of local signals in the receiving operation of receiving the reception bands I, II, VI, and XI of the receiver in the RFIC (19) for communication in FIG. 10.

<<Receiver Including Analog Phase Converting Unit>>

Figure 12:
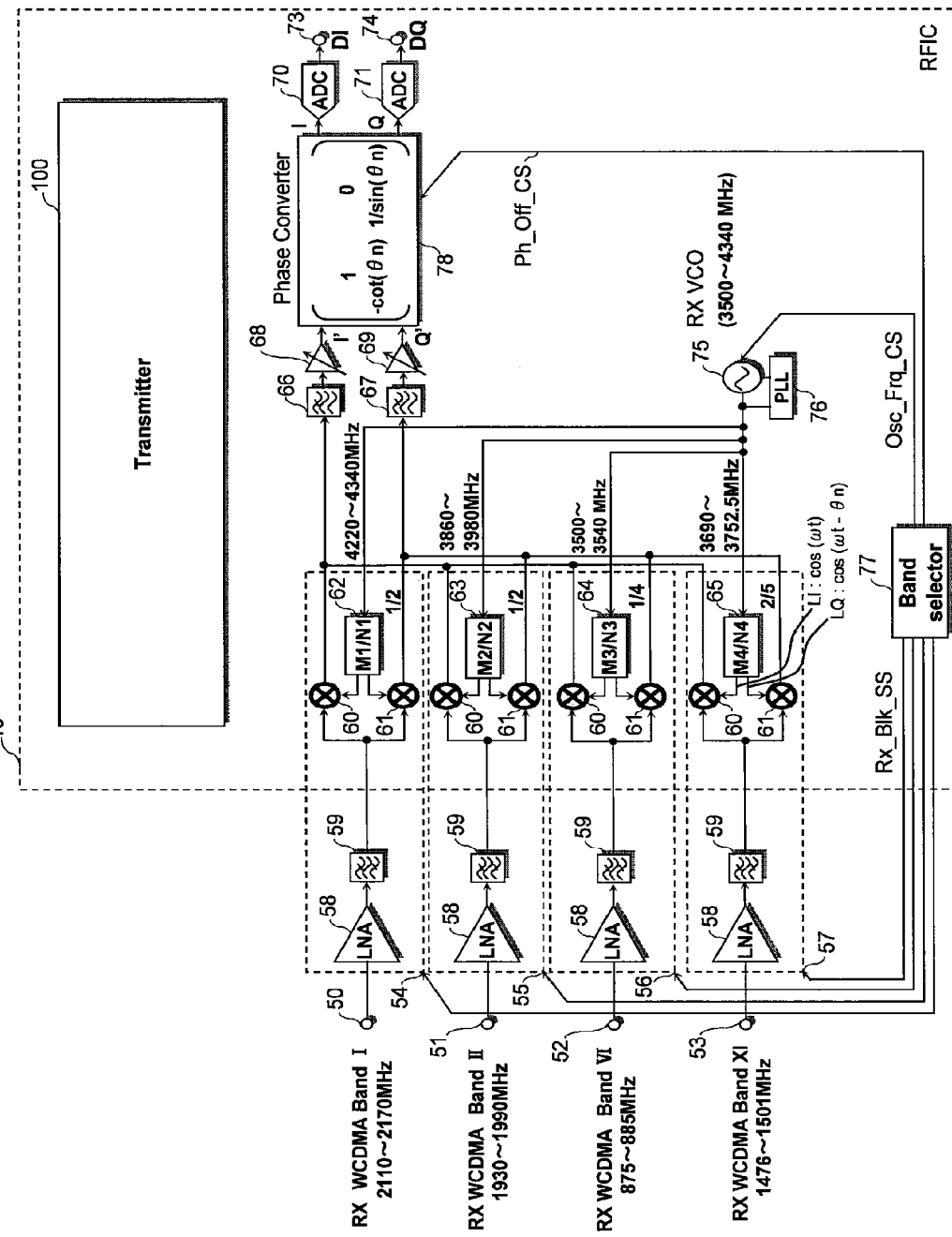
FIG. 12 is a diagram showing a direct down-conversion receiver of a multimode/multiband communication RFIC as another embodiment of the present invention.

FIG. 12 is a diagram showing a direct down-conversion transmitter for multiband/multimode communication as another embodiment of the present invention.

In the receiver in FIG. 12, instead of deleting the digital phase converting unit 72 in the receiver in FIG. 10, an analog phase converting unit 78 is coupled between output terminals of the variable gain amplifiers 68 and 69 and the A/D converters 70 and 71.

In FIG. 12, at the time of reception of the reception band XI, the phase difference of the pair of analog baseband reception signals obtained from outputs of the pair of mixers 60 and 61 constructing the I/Q demodulator of the reception block Rx_Blk4 does not become 90 degrees but is M4·π/N4=180°/2.5=72°. The pair of analog baseband reception signals having a phase difference of 72 degrees have an error offset angle of −18° (=72°−90°) from the ideal phase difference of 90 degrees.

In the receiver shown in FIG. 12, the pair of analog baseband reception signals having an error offset angle of −18 degrees at the output terminals of the variable gain amplifiers 68 and 69 are converted to a pair of converted analog baseband signals I and Q by the analog phase converting unit 78 having the compensation amount of 18 degrees. The pair of converted analog baseband signals I and Q having the phase difference of 90 degrees directly analog converted by the analog phase converting unit 78 are input to the input terminals of the A/D converters 70 and 71, and quadrature demodulation digital baseband reception signals having the accurate phase difference of 90 degrees are obtained from the pair of output terminals 73 and 74 of the receiver. The analog phase converting unit 78 executes matrix analog operation.

$$\begin{pmatrix} I'(t) \\ Q'(t) \end{pmatrix} = \begin{bmatrix} 1 & 0 \\ \cot(\theta n) & \frac{1}{\sin(\theta n)} \end{bmatrix} \times \begin{pmatrix} I(t) \\ Q(t) \end{pmatrix} \qquad \text{Equation (2)}$$

A phase offset amount selection signal θn of the matrix is given by a calculating formula θn=180*M/N*A (A=1, 2, . . . ) where N/M denotes a frequency dividing ratio of the frequency dividers 62, 63, 64, and 65 included in the reception blocks Rx_Blk1, Rx_Blk2, Rx_Blk3, and Rx_Blk4 selected by the reception block selection signal in the band selector 77. The value of the phase offset amount selection signal θn is equal to the phase difference of the pair of reception local signals from the frequency dividers 62, 63, 64, and 65, is equal to 90 degrees in the receiving operation of receiving the reception bands I, II, and VI, and is equal to 108 degrees in the receiving operation of receiving the reception band XI.

<<Direct Conversion Transceiver>>

Figure 13:
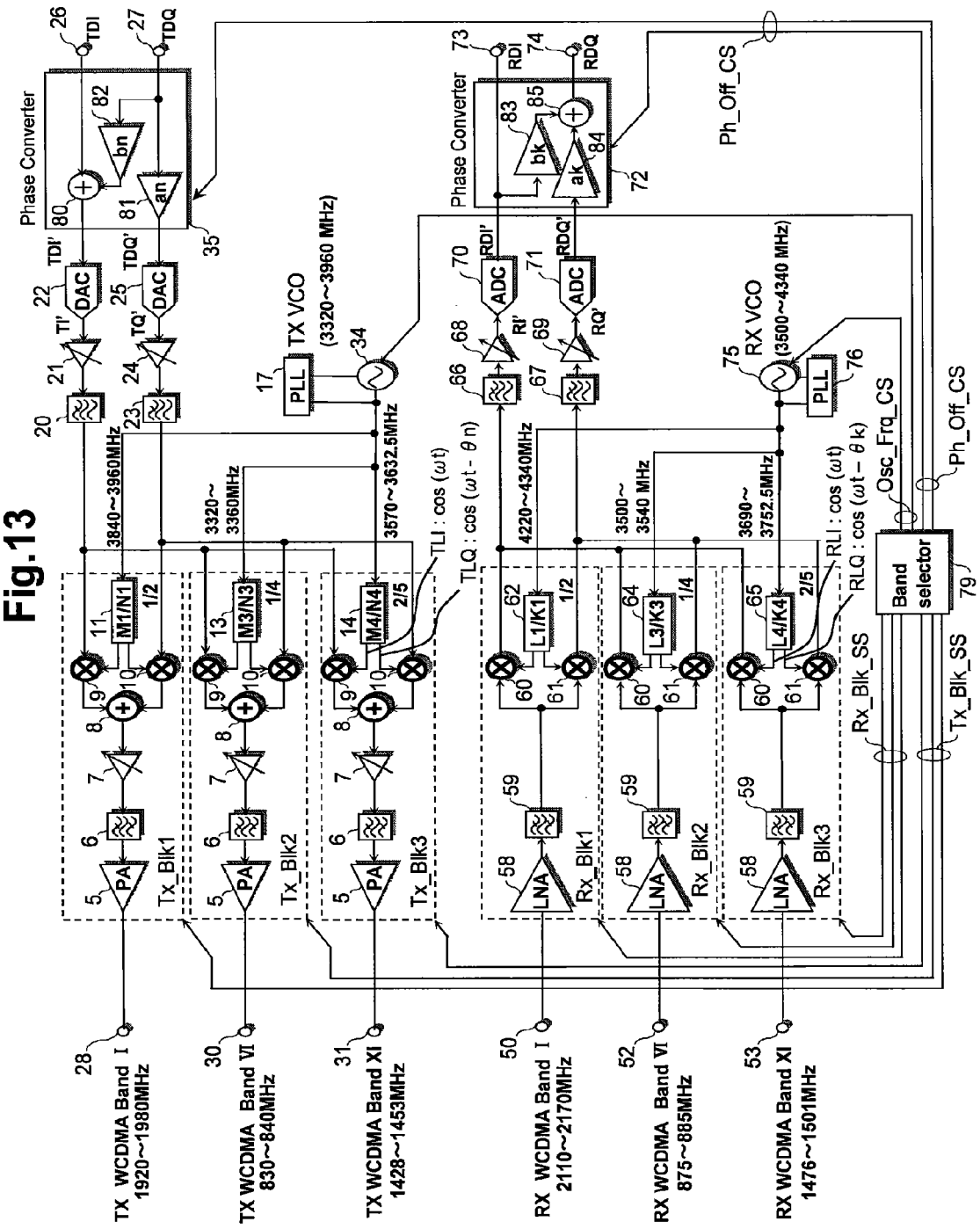
FIG. 13 is a diagram showing a direct conversion transceiver of a multimode/multiband communication RFIC as an embodiment of the present invention.

FIG. 13 is a diagram showing the configuration of a direct conversion (DC) transceiver of an RFIC for multiband/multimode communication as further another embodiment of the present invention obtained by combining the transmitter of the DUC architecture shown in FIG. 1 and the receiver of the DDC architecture shown in FIG. 10.

The transceiver of FIG. 13 is constructed by three transmission blocks Tx_Blk1, Tx_Blk2, and Tx_Blk3 and three reception blocks Rx_Blk1, Rx_Blk2, and Rx_Blk3 and is adapted to triple band transmission/reception. By further adding another transmission block and another reception block in parallel, the transceiver can support the larger number of band transmissions/receptions.

Each of the transmission blocks Tx_Blk1, Tx_Blk2, and Tx_Blk3 includes a power amplifier 5, a band pass filter 6, a variable gain amplifier 7, mixers 9 and 10 for a quadrature modulator, and transmission frequency dividers 11, 13, and 14.

The frequency division number of the transmission frequency divider 14 of the transmission block Tx_Blk3 for transmitting the transmission band XI is set to a non-integer of 2.5. However, the frequency division number of the transmission frequency divider 11 of the transmission block Tx_Blk1 for transmitting the transmission band I is set to an even-numbered integer of 2, and the frequency division number of the transmission frequency divider 13 of the transmission block Tx_Blk2 for transmitting the transmission band VI is set to an even-numbered integer of 4.

When the transmission frequency divider whose frequency division number is set to an even number is selected, the phase difference between a pair of transmission local signals is 90 degrees. On the other hand, when the transmission frequency divider whose frequency division number is set to a non-integer is used, the phase difference of the pair of transmission local signals has an error offset angle from 90 degrees. At this time, the transmission digital phase converting unit 35 generates two phase conversion digital baseband transmission signals TDI' and TDQ' corresponding to the error offset angle of the phase difference of the transmission local signals. The two phase conversion digital baseband transmission signals TDI' and TDQ' have a compensation phase offset amount having a polarity opposite to that of the analog conversion error offset angle and having almost the same absolute value.

The transmission digital phase converting unit 35 is constructed by two digital multipliers 81 and 82 and a digital adder 80. The coefficients of the digital multipliers 81 and 82 are calculated as follows according to the phase difference θn of the pair of transmission local signals generated by the frequency divider 14 selected.

$$an = -1/\sin(\theta n)$$
$$bn = \cot(\theta n)$$

Equation (3)

By disposing the transmission digital phase converting unit 35, quadrature modulation can be realized by an output of the I/Q modulator formed by the pair of mixers 9 and 10 and the adder 8 in the transmission block Tx_Blk3 for transmitting the transmission band XI including the transmission frequency divider 14 whose frequency division number is set to a non-integer of 2.5.

Each of the reception blocks Rx_Blk1, Rx_Blk2, and Rx_Blk3 includes a low noise amplifier 58, a band pass filter 59, mixers 60 and 61 for quadrature demodulation, and a frequency divider 62, 64, or 65 for reception.

The frequency dividing number of the frequency divider 65 for reception of the reception block Rx_Blk3 for receiving the reception band XI is set to a non-integer of 2.5. However, the frequency dividing number of the frequency divider 62 for reception of the reception block Rx_Blk1 for receiving the reception band I is set to an even-numbered integer of 2, and the frequency dividing number of the frequency divider 64 for reception of the reception block Rx_Blk2 for receiving the reception band VI is set to an even-numbered integer of 4.

When the frequency divider for reception whose frequency dividing number is set to an even number is selected, the phase difference between the pair of local signals for reception is 90 degrees. On the other hand, at the time of using the frequency divider for reception whose frequency dividing number is set to a non-integer, the phase difference of the pair of local signals for reception has an error offset angle with respect to 90 degrees. In this case, the digital phase converting unit 72 for reception generates two phase conversion digital baseband reception signals RDI and RDQ corresponding to the error offset angle of the phase difference of the reception local signals. The two phase conversion digital baseband reception signals RDI and RDQ have a compensation phase offset amount having a polarity opposite to that of the error offset angle in analog conversion and having an equal absolute value.

The phase converting unit 72 for reception is constructed by two digital multipliers 83 and 84 and a digital adder 85. The coefficients of the digital multipliers 83 and 84 are calculated as follows according to the phase difference θn of the pair of reception local signals generated by the selected frequency divider 65.

$$\begin{pmatrix} I'(t) \\ Q'(t) \end{pmatrix} = \begin{bmatrix} 1 & 0 \\ \cot(\theta n) & \frac{1}{\sin(\theta n)} \end{bmatrix} \times \begin{pmatrix} I(t) \\ Q(t) \end{pmatrix}$$

Equation (4)

By disposing the phase converting unit 72 for reception, even when the frequency dividing number of the frequency divider 65 for reception of the reception block Rx_Blk4 for receiving the reception band XI is set to a non-integer of 2.5, a pair of quadrature digital baseband reception signals can be output from the outputs 73 and 74 of the phase converting unit 72 for reception.

FIG. 14 is a table of the oscillation frequency band of the voltage-controlled oscillator 75, RF transmission signal frequency band, the frequency dividing ratio of the frequency divider in each of the blocks, and error offset angle of a pair of local signals in the transmitting/receiving operations in the transmission/reception bands I, II, III, IV, V, VI, VII, VIII, IX, X, and XI of the transceiver in the RFIC for communication in FIG. 13. The upper part of FIG. 14 shows the uplink (UL) transmitting operation from a cellular phone terminal to a base station, and the lower part of FIG. 14 shows the downlink (DL) receiving operation from the base station to the cellular phone terminal.

In the transmitting operation of the transmission band VII of uplink (UL) to the base station in the upper part of FIG. 14, the frequency dividing number of the frequency divider 14 for transmission of the transmission block Tx_Blk3 in the communication RFIC of FIG. 13 is set to a non-integer of 1.5 (the frequency dividing ratio is 2/3). Consequently, an RF transmission signal of the transmission band VII of transmission frequency of 2500 to 2570 MHz which is almost equal to the frequency obtained by dividing 3750 to 3855 MHz of the voltage-controlled oscillator 17 for transmission by the frequency dividing number 1.5 can be generated.

In the receiving operation of the reception band VII of downlink (DL) to the base station in the lower part of FIG. 14, the frequency dividing number of the frequency divider 65 for reception of the reception block Rx_Blk3 in the communication RFIC of FIG. 13 is set to a non-integer of 1.5 (the frequency dividing ratio is 2/3). Consequently, an RF transmission signal of the transmission band VII of reception frequency of 2620 to 2690 MHz which is almost equal to the frequency obtained by dividing 3930 to 4035 MHz of the voltage-controlled oscillator 75 for reception by the frequency dividing number 1.5 can be generated.

Like FIG. 14, FIG. 15 is a table of the oscillation frequency band of the voltage-controlled oscillator, RF transmission signal frequency band, the frequency dividing ratio of the frequency divider in each of the blocks, and error offset angle of a pair of local signals in the transmitting/receiving operations in the transmission/reception bands I, II, III, IV, V, VI, VII, VIII, IX, X, and XI of the transceiver in the RFIC for communication in FIG. 13. The upper part of FIG. 15 shows the uplink (UL) transmitting operation from a cellular phone terminal to a base station, and the lower part of FIG. 15 shows the downlink (DL) receiving operation from the base station to the cellular phone terminal.

In the transmitting/receiving operations of the transmission band VII in the upper and lower parts of FIG. 15, the frequency dividing number of the frequency divider for transmission/reception in the communication RFIC of FIG. 13 is set to a non-integer of 1.5 (the frequency dividing ratio is 2/3). Transmission of the transmission frequencies 2500 to 2570 MHz and reception of the reception frequencies 2620 to 2690 MHz can be performed. Similarly, in the transmission/reception band III, transmission band IV, transmission/reception band IX, and transmission band X in the upper and lower parts of FIG. 15, the frequency dividing number is set to a non-integer of 2.25 (the frequency dividing ratio is 4/9). In the transmitting/receiving operations in the transmission/reception band V and the transmission/reception band VI in the upper and lower parts of FIG. 15, the frequency dividing number of the transmission/reception frequency divider is set to a non-integer of 4.5 (the frequency dividing ratio is 2/9).

In the transmitting/receiving operation of FIG. 15, a change range of the frequency dividing number of the transmission/reception frequency divider is set to be large, as compared with the fractional band width of the voltage-controlled oscillator in transmission/reception of FIG. 14, the fractional band width of the voltage-controlled oscillator in transmission/reception of FIG. 15 can be reduced.

FIG. 16 is a table of the oscillation frequency band of the voltage-controlled oscillator, RF transmission signal frequency band, the frequency dividing ratio of the frequency divider in each of the blocks, and error offset angle of local signals in the transmission/reception of the transmission/reception bands I, . . . X, and XI of WCDMA of the transceiver in the RFIC in FIG. 13 and in the transmitting/receiving operations of a wireless LAN of 5 GHz and 2.4 GHz. The wireless LAN of 5 GHz is conformed with the standard IEEE802.11a, and the wireless LAN of 2.4 GHz is conformed with the standard IEEE802.11b,g.

In the transmitting/receiving operations of FIG. 16, the oscillation frequency of the transmission/reception voltage-controlled oscillator for transmitting/receiving an extremely high RF signal of the wireless LAN of 5 GHz is set to a high value of about 10 GHz. To support the multimode of an extremely large number of the transmission/reception ban I of WCDMA, . . . , transmission/reception band X, band XI, and bands of the IEEE802.11a, b, and g of a wireless LAN, the frequency dividing number of the frequency divider for transmission/reception is set in an extremely large change range including integers and non-integers.

<<Transceiver including Reception Calibration Circuit>>

Figure 17:
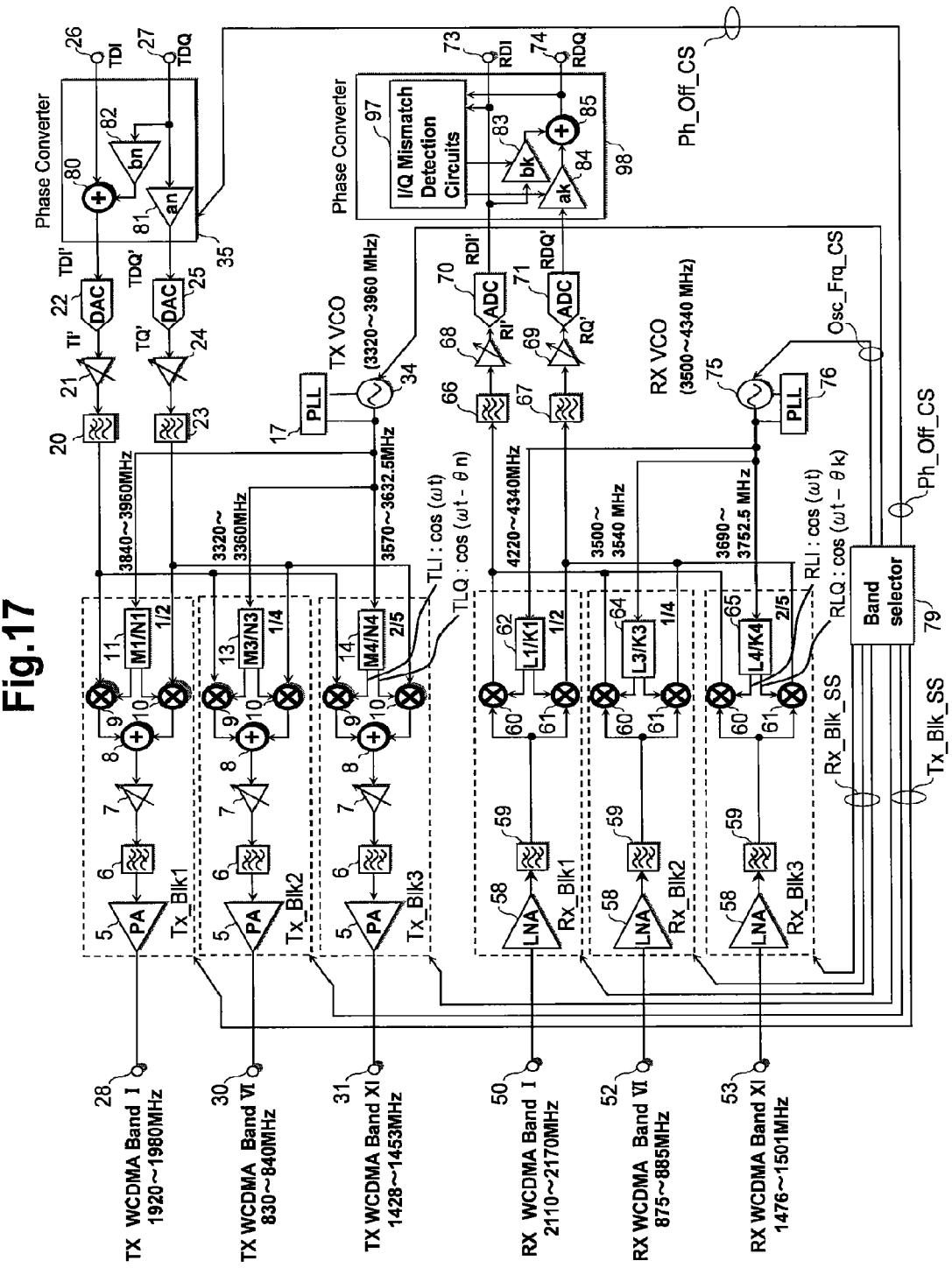
FIG. 17 is a diagram showing a direct conversion transceiver of a multimode/multiband communication RFIC as another embodiment of the present invention.

FIG. 17 is a diagram showing the configuration of a direct conversion transceiver of an RFIC for multiband/multimode communication as another embodiment of the present invention.

In the transceiver shown in FIG. 17, the configuration of a reception data converting unit 98 in the receiver is different from the reception phase converting unit 72 in the receiver shown in FIG. 13. Specifically, in the transmitter shown in FIG. 17, a reception I/Q calibration circuit 97 is added to the reception data converting unit 98. The added reception I/Q calibration circuit 97 detects a phase error which is 90 degrees from the ideal value between an I-side reception digital baseband signal RDI and a Q-side reception digital baseband signal RDQ. The reception I/Q calibration circuit 97 calculates calibration coefficient values of the phase converting circuits 83 and 84 for the phase difference of the detected reception digital baseband signals RDI and RDQ. Therefore, the final reception digital baseband signals RDI and RDQ become a pair of quadrature (orthogonal) reception digital signals having the phase difference substantially equal to the ideal value of 90 degrees.

<<Change in Image Suppression Level due to Phase Error in I/Q Modulator for Transmission>>

Figure 18:
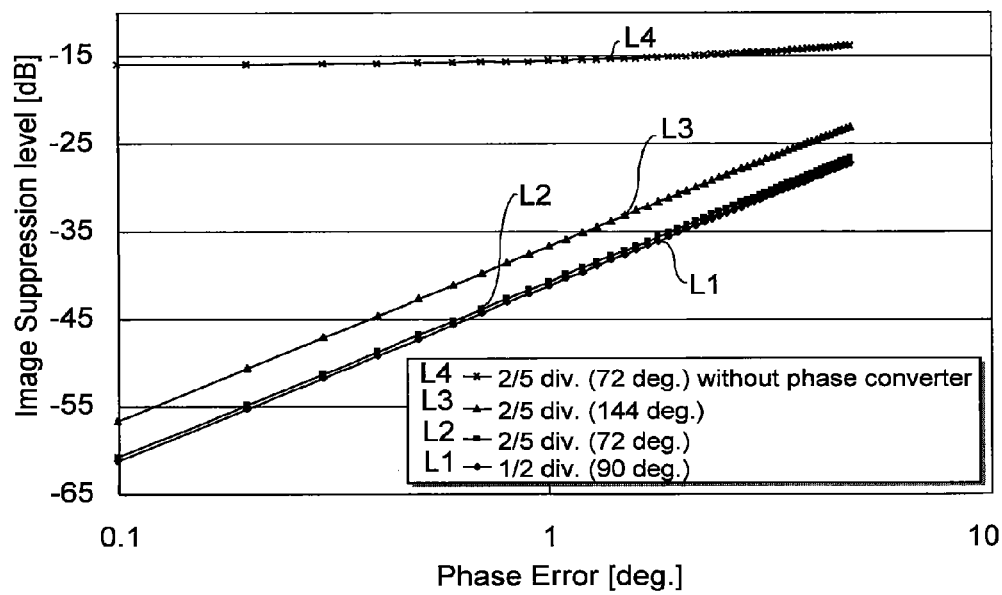
FIG. 18 is a diagram showing a change in an image suppression level due to a phase error in an I/Q modulator for transmission according to the frequency dividing number of a logic frequency divider of a direct up-conversion transmitter of the RFIC for communication.

FIG. 18 is a diagram showing a change in an image suppression level due to a phase difference in a pair of transmission local signals generated from the frequency dividers 11, 13, and 14 of direct up-conversion architecture transmitters of the RFIC for communication shown in FIG. 17. The horizontal axis of FIG. 18 indicates a phase error of the transmission local signal or a phase error of a pair of analog baseband transmission signals, and the vertical axis indicates an image suppression level.

The characteristics when the frequency dividing number of the frequency divider 11 in FIG. 17 is an integer of 2 and the phase difference of a pair of local signals is 90 degrees are excellent since the image suppression level for a change in the phase error is high as shown by straight line L1 in FIG. 18.

On the other hand, the characteristics when the signal phase difference of a pair of local signals becomes 72 degrees by using a frequency divider 14 in FIG. 17 whose frequency dividing number is a non-integer of 2.5 and yet phase compensation of 108 degrees in analog conversion is not performed by the phase converting unit 35 in FIG. 13 or 17 are bad since the image suppression level is low as shown by straight line L4 in FIG. 18. The characteristics when the phase difference of the pair of local signals becomes 144 degrees are also bad since the image suppression level is low as shown by straight line L3 in FIG. 18.

However, the characteristics when the phase difference of a pair of local signals becomes 72 degrees by using a frequency divider 14 in FIG. 17 whose frequency dividing number is a non-integer of 2.5 and phase compensation of 108 degrees in analog conversion is performed by the phase converting unit 35 in FIG. 13 or 17 are excellent since the image suppression level is high as shown by straight line L2 in FIG. 18. Therefore, it can be understood that even when the frequency divider whose frequency dividing number is a non-integer of 2.5 is used and the phase difference of a pair of local signals becomes 72 degrees, by using the phase converting unit 35, characteristics equivalent to the characteristics L1 when the frequency dividing number of the frequency divider is an integer of 2 and the phase difference of the pair of local signals is 90 degrees are obtained.

<<RFIC for Communication Adapted to Multimode/Multiband>>

Figure 19:
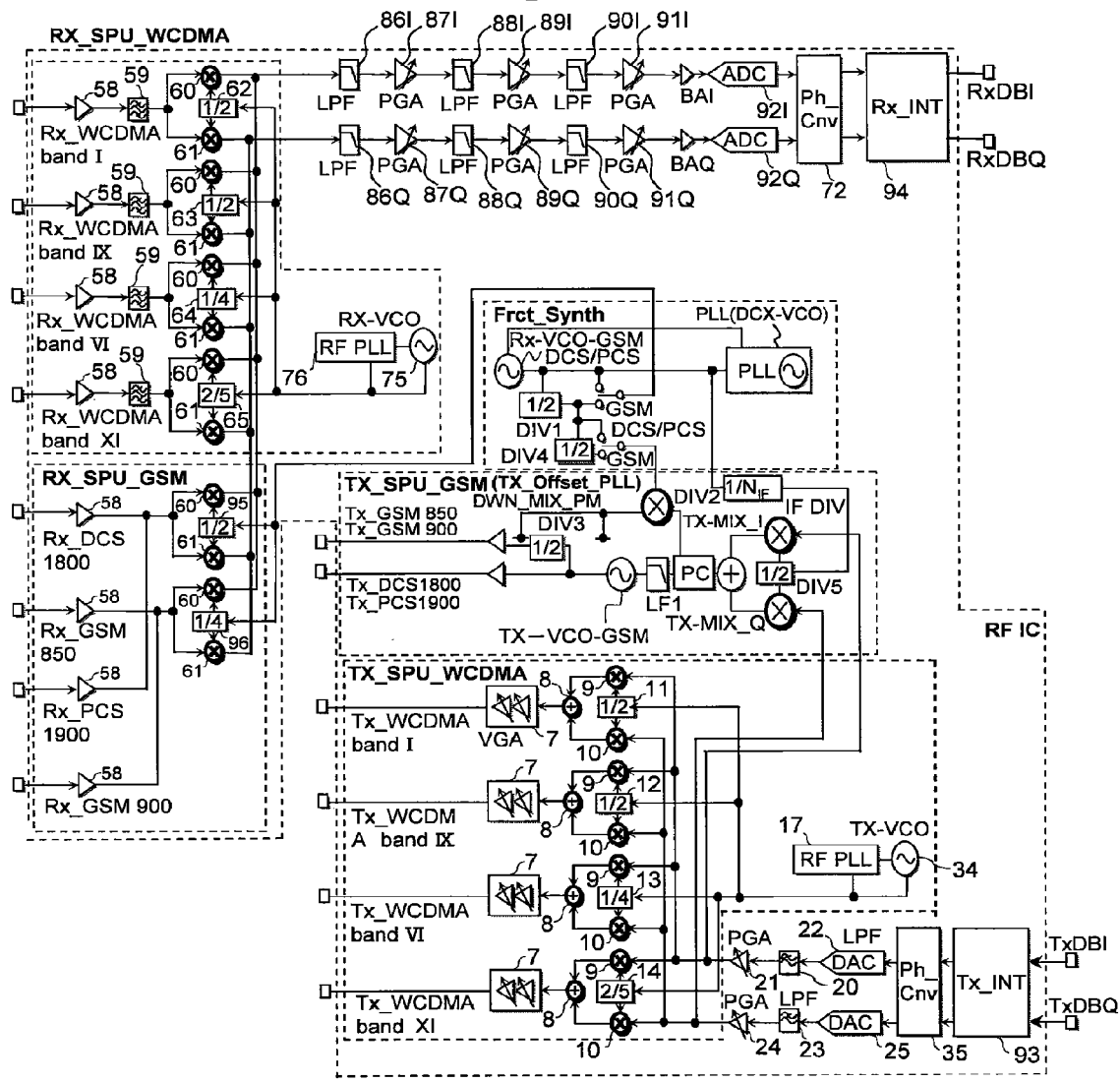
FIG. 19 is a diagram showing a direct conversion transceiver of a multimode/multiband communication RFIC as another embodiment of the present invention.

FIG. 19 is a block diagram showing an RFIC for communication adapted to multimode/multiband as another embodiment of the present invention. The RFIC for communication can perform transmission/reception of the bands I, IX, VI, and XI in WCDMA and also transmission/reception of the GSM850, GSM900, DCS1800, and PCS1900.

The transmission/reception bandwidths in the respective bands of the WCDMA system are as shown in FIG. 14. On the other hand, in the case of GSM850, the frequency band of the RF transmission signal TX of a wireless communication terminal is 824 to 849 MHz, and the frequency band of the RF reception signal RX of the wireless communication terminal is 869 to 894 MHz. In the case of GSM900, the frequency band of the RF transmission signal TX of the wireless communication terminal is 880 to 915 MHz, and the frequency band of the RF reception signal RX of the wireless communication terminal is 925 to 960 MHz. In the case of DCS1800, the frequency band of the RF transmission signal TX of the wireless communication terminal is 1710 to 1785 MHz, and the frequency band of the RF reception signal RX of the wireless communication terminal is 1805 to 1880 MHz. In the case of PCS1900, the frequency band of the RF transmission signal TX of the wireless communication terminal is 1850 to 1910 MHz, and the frequency band of the RF reception signal RX of the wireless communication terminal is 1930 to 1990 MHz. In any of the frequency bands, the FDD method in which the reception band frequency RX is higher than the transmission band frequency TX is employed. FDD stands for frequency division duplex.

<<Transmission/Reception Circuit in WCDMA>>

A circuit RX_SPU_WCDMA in a left upper part of an RFIC shown in FIG. 19 is a circuit for receiving the bands I, IX, VI, and XI in the WCDMA system. A circuit TX_SPU_WCDMA in a lower part of the RFIC shown in FIG. 19 is a circuit for transmitting the bands I, IX, VI, and XI in the WCDMA system.

<<Transmission/Reception Circuit in GSM>>

A circuit RX_SPU_GSM in a left lower part of the RFIC shown in FIG. 19 is a circuit for receiving GSM850, GSM900, DCS1800, and PCS1900. A circuit TX_SPU_GSM in a center portion of the RFIC shown in FIG. 19 is a circuit for transmitting GSM850, GSM900, DCS1800, and PCS1900.

A circuit Frct_Synth in the center of the RFIC shown in FIG. 19 is a fractional synthesizer for generating a GSM transmission/reception local signal of the RFIC. The fractional synthesizer Frct_Synth includes a voltage-controlled oscillator RX-VCO-GSM for reception, a phase locked loop (PLL) having therein a system reference voltage controlled oscillator (DCX-VCO), a plurality of frequency dividers, and a plurality of switches.

<<Phase Converting Unit for WCDMA Reception>>

Also in the "reception mode" of any of the communication methods, an I, Q analog baseband reception signal is generated at the output of the WCDMA reception circuit RX_SPU_WCDMA or at the output of another reception circuit RX_SPU_GSM. The signal is supplied to A/D converters 92I and 92Q via low-pass filters 86, 88, and 90 and variable gain amplifiers (PGA) 87, 89, 91 to I, Q digital baseband reception signals. The baseband reception signals are supplied to a baseband signal processor LSI via a reception digital phase converting unit 72 and a reception digital interface 94. The frequency dividing numbers of frequency dividers 62, 63, 64, and 65 of the WCDMA reception circuit RX_SPU_WCDMA shown in FIG. 19 are set as follows. The frequency dividing numbers of the frequency divider 62 for the band I and the frequency divider 63 for the band IX are set to an integer of 2. The frequency dividing number of the frequency divider 64 for the band VI is set to an integer of 4. The frequency dividing number of the frequency divider 65 for the band XI is set to a non-integer of 5/2=2.5. The phase difference of a pair of reception local signals supplied to a pair of reception mixers 60 and 61 in response to an oscillation output from a voltage-controlled oscillator 75 (RX-VCO) for reception is 90 degrees in the modes of the bands I, IX, and VI, and is 72 degrees in the mode of the band XI.

In the another reception circuit RX_SPU_GSM in FIG. 19, the frequency dividing number of the frequency divider 95 for DCS1800 and PCS1900 is set to an integer of 2. The frequency dividing number of the frequency divider 96 for GSM850 and GSM900 is set to an integer of 4. The phase difference of a pair of reception local signals supplied to the pair of reception mixers 60 and 61 in response to the oscillation output from the voltage-controlled oscillator RX-VCO-GSM for reception is 90 degrees in all of the modes of GSM850, GSM900, DCS1800, and PCS1900. In reception of WCDMA or GSM, like the digital phase converting unit 72 in FIG. 10, the digital phase converting unit 72 for reception coupled to the A/D converters 92I and 92Q performs data conversion so that two digital reception signals obtained from its two output terminals have a phase difference of 90 degrees in analog conversion.

<<Phase Converting Unit for WCDMA Transmission>>

Digital baseband transmission signals TxDBI and TxDBQ from the baseband signal processor LSI are received by a transmission-system digital interface 93 in the RFIC and converted by the transmission digital phase converting unit 35.

The digital baseband transmission input signals of the two input terminals of the transmission digital phase converting unit 35 have a phase difference of 90 degrees in analog conversion. On the other hand, digital conversion signals of the two output terminals of the digital phase converting unit 35 have a predetermined analog offset angle according to the phase difference of the transmission local signals such as the analog signal phase difference of 90 degrees in analog conversion. The offset angle is obtained for the reason that by using a frequency divider whose frequency dividing number is a non-integer of 2.5 as the frequency divider for the band XI of the WCDMA transmission circuit TX_SPU_WCDMA, even the phase difference of a pair of local signals becomes 72 degrees, characteristics equivalent to those when the frequency dividing number is an integer of 2 and the phase difference of a pair of local signals is 90 degrees are obtained. Digital conversion signals of the two output terminals of the digital phase converting unit 35 are converted to analog baseband transmission signals by the D/A converters 22 and 25. The phase difference of analog baseband transmission signals as outputs of the D/A converters 22 and 25 has a predetermined analog offset angle according to the transmission local signal phase difference which is 90 degrees.

<<WCDMA Transmission using Phase Converting Unit>>

In the WCDMA transmission, analog baseband signals as outputs of the D/A converters 22 and 25 are supplied to one of input terminals of the pair of mixers 9 and 10 in the WCDMA transmission circuit TX_SPU_WCDMA via the low-pass filters 20 and 23 and the variable gain amplifiers (PGAs) 21 and 24. The frequency dividing numbers of frequency dividers 11,

12, 13, and 14 of the WCDMA transmission circuit TX_SPU_WCDMA shown in FIG. 19 are set as follows. The frequency dividing numbers of the frequency divider 11 for the band I and the frequency divider 12 for the band IX are set to an integer of 2. The frequency dividing number of the frequency divider 13 for the band VI is set to an integer of 4. The frequency dividing number of the frequency divider 14 for the band XI is set to a non-integer of 5/2=2.5. The phase difference of a pair of transmission local signals supplied to the other input terminal of the pair of mixers 9 and 10 in response to an oscillation output from a voltage-controlled oscillator 34 (TXVCO) for transmission is 90 degrees in the modes of the bands I, IX, and VI, and is 72 degrees in the mode of the band XI. Particularly, in the mode of the band XI, a predetermined offset angle according to the phase difference of the local signals is added to the analog baseband signals by the digital phase converting unit 35. As a result, the sum of the local signal offset angle and the predetermined analog baseband signal offset angle becomes substantially zero. Therefore, in the transmission mode of all of bands, the transmission modulator constructed by the pair of transmission mixers 9 and 10 and the adder 8 can perform accurate quadrature modulation.

<<GSM Transmission>>

In the GSM transmission, the analog baseband signals as outputs of the variable gain amplifiers (PGAs) 21 and 24 are supplied to one of the input terminals of a pair of transmission mixers TX-MIX_I and TX-MIX_Q of the other transmission circuit TX_SPU_GSM. An oscillation signal of the voltage-controlled oscillator RX-VCO-GSM of the fractional synthesizer Frct_Synth is supplied to a local frequency divider DIV5 via an intermediate frequency divider DIV2 (1/NIF). The local frequency divider DIV5 of the other transmission circuit TX_SPU_GSM in FIG. 19 generates a pair of transmission intermediate frequency local signals to be supplied to a pair of transmission mixers TX-MIX_I and TX-MIX_Q in response to an intermediate frequency signal as the output of the frequency divider DIV2 (1/NIF). The phase signal of the local signals is degrees. Therefore, by the transmission modulator constructed by the pair of transmission mixers TX-MIX_I and TX-MIX_Q and the adder, accurate quadrature modulation can be performed.

A transmission-system offset PLL circuit TX_OFFset_PLL has to support the transmitting operation of a GSM850 RF transmission signal Tx_GSM850 and a GSM900 RF transmission signal Tx_GSM900. Consequently, the oscillation frequency of the voltage-controlled oscillator RX-VCO-GSM is supplied to one of input terminals of a frequency down mixer DWN_MIX_PM for phase control feedback via the two frequency dividers DIV1 (1/2) and DIV4 (1/2) whose frequency dividing number is set to 2. The frequency dividing number NIF of the intermediate frequency divider DIV2 (1/NIF) coupled to the frequency divider DIV5 for the transmission mixers TX-MIX_1 and TX-MIX_Q is set to 13.

<<Transmitting Operation of GSM850 and GSM900>>

An oscillation output signal of a voltage-controlled oscillator TX-VCO_GSM for GSM transmission is supplied to the other input terminal of the frequency down mixer DWN_MIX_PM for phase control feedback via the frequency divider DIV3 whose frequency division number is set to 2. As a result, the down mixer DWN_MIX_PM mixes the one input signal and the other input signal. Therefore, a feedback signal of the frequency equal to the difference of the two input signals is generated from the output of the down mixer DWN_MIX_PM, and supplied to the other input terminal of the phase comparator PC of the transmission-system offset PLL circuit TX_OFFset_PLL. To one of input terminals of the phase comparator PC, an intermediate frequency transmission signal fIF obtained by performing vector synthesis on an output of an adder coupled to the output of the transmission mixer TX-MIX_I,Q is supplied as a reference signal. The total frequency dividing number made by 13 as the frequency dividing number NIF of the intermediate frequency divider DIV2 (1/NIF) and 2 as the frequency dividing number of the frequency divider DIV5 is 26. Therefore, the frequency of the intermediate frequency transmission signal fIF is 1/26 of the frequency of the voltage-controlled oscillator Rx-VCO-GSM for reception. By negative feedback control of the transmission-system offset PLL circuit TX_OFFset_PLL, the reference signal of one of input terminals of a phase comparator PC and a feedback signal from the down mixer DWN_MIX_PM of the other input terminal coincide with each other. As a result, in the transmission of GSM850 of an RF transmission signal of 0.8 GHz and GSM900 of an RF transmission signal of 0.9 GHz, it is sufficient for the voltage-controlled oscillator RX-VCO-GSM for reception to oscillate at about 3.2 GHz to 3.8 GHz which is about four times and it is sufficient for the voltage-controlled oscillator TXVCO_GSM for GSM transmission to oscillate at about 1.6 GHz to 1.9 GHz which is about twice as high as the transmission frequency.

<<Transmitting Operation of DCS1800 and PSC1900>>

The transmission-system offset PLL circuit TX_OFFset_PLL has to support transmitting operation of an RF transmission signal Tx_DCS1800 of DCS1800 and an RF transmission signal Tx_PSC1900 of PSC1900. The oscillation frequency of the voltage-controlled oscillator RX-VCO-GSM for reception is supplied to one of the input terminals of the frequency down mixer DWN_MIX_PM for phase control feedback via the frequency divider DIV1 (1/2) whose frequency division number is set to 2. The frequency dividing number NIF of the intermediate frequency divider DIV2 (1/NIF) coupled to the frequency divider DIV5 for the transmission mixers TX-MIX_I and TX-MIX_Q is set to 13. On the other hand, the oscillation output signal of the voltage-controlled oscillator TXVCO_GSM for GSM transmission is supplied to the other input terminal of the frequency down mixer DWN_MIX_PM for phase control feedback. As a result, the down mixer DWN_MIX_PM mixes the one input signal and the other input signal. Therefore, a feedback signal of the frequency of the difference of the two input signals is generated from the output of the down mixer DWN_MIX_PM, and supplied to the other input terminal of the phase comparator PC of the transmission-system offset PLL circuit TX_OFFset_PLL. To one of input terminals of the phase comparator PC, an intermediate frequency transmission signal fIF obtained by performing vector synthesis on an output of an adder coupled to the output of the transmission mixer TX-MIX_I,Q is supplied as a reference signal. The total frequency dividing number made by 13 as the frequency dividing number NIF of the intermediate frequency divider DIV2 (1/NIF) and 2 as the frequency dividing number of the frequency divider DIV5 is 26. Therefore, the frequency of the intermediate frequency transmission signal fIF is 1/26 of the frequency of the voltage-controlled oscillator Rx-VCO-GSM for reception.

By negative feedback control of the transmission-system offset PLL circuit TX_OFFset_PLL, the reference signal of one of input terminals of the phase comparator PC and a feedback signal from the down mixer DWN_MIX_PM of the other input terminal coincide with each other. As a result, in the transmission of DCS1800 of an RF transmission signal of 1.7 GHz and PCS1900 of an RF transmission signal of 1.9

GHz, it is sufficient for the voltage-controlled oscillator RX-VCO-GSM for reception to oscillate at about 3.2 GHz to 3.8 GHz which is about twice and it is sufficient for the voltage-controlled oscillator TXVCO_GSM for GSM transmission to oscillate at about 1.6 GHz to 1.9 GHz which is almost equal to the transmission frequency.

<<Configuration of Cellular Phone>>

Figure 20:
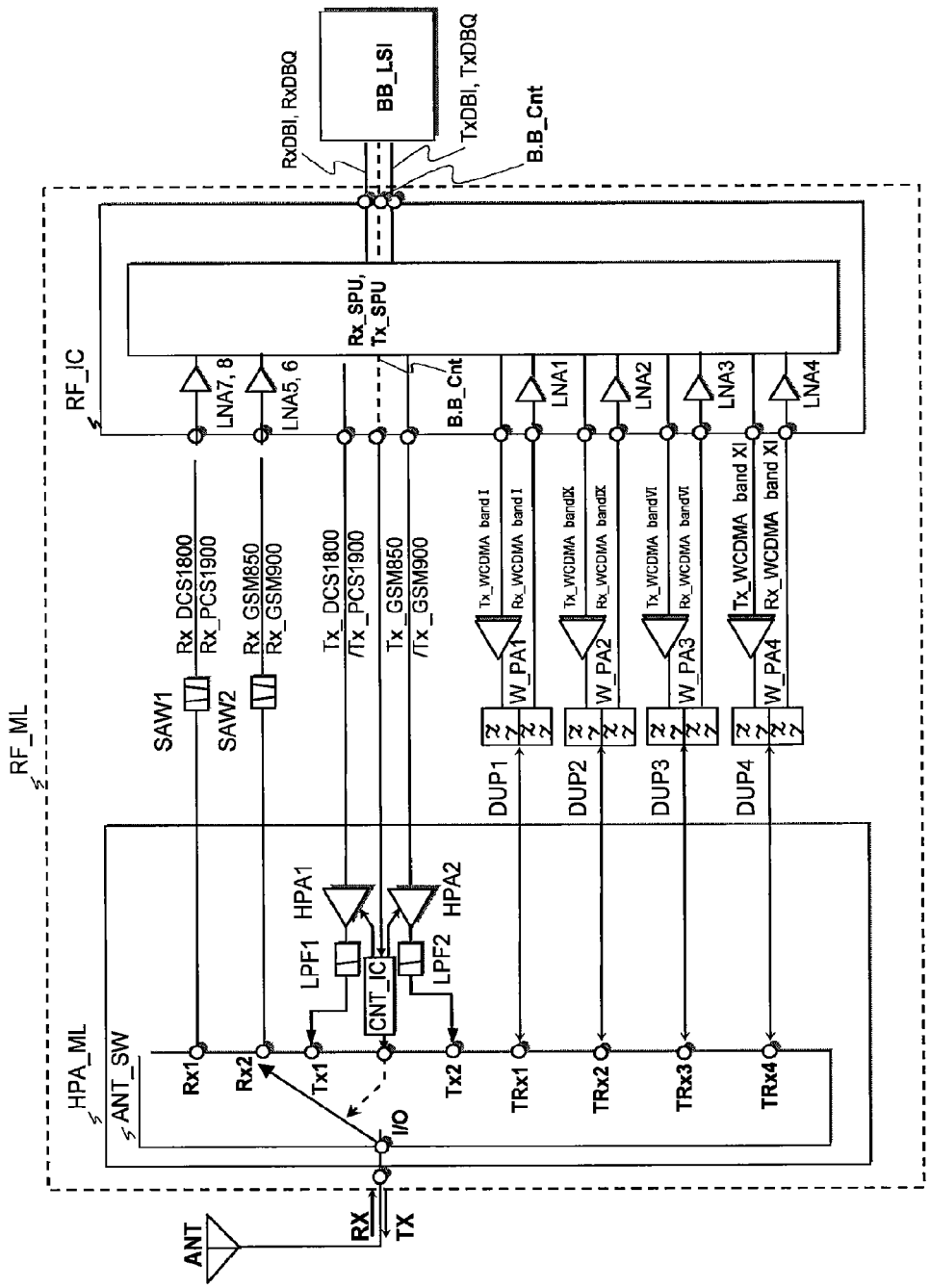
FIG. 20 is a block diagram showing the configuration of a cellular phone including an RFIC as an embodiment of the present invention, an antenna switch MMIC, an RF module including an RF power amplifier, and a baseband signal process LSI.

FIG. 20 is a block diagram showing the configuration of a cellular phone including an RFIC as an embodiment of the present invention described above, an RF module having therein an antenna switch MMIC and an RF power amplifier, and a baseband signal processor LSI. MMIC stands for microwave monolithic IC.

In the diagram, a common input/output terminal I/O of the antenna switch MMIC(ANT_SW) of an RF module RF_ML is coupled to an antenna ANT for transmission/reception of a cellular phone. A control signal B.B_Cont from the baseband signal processor LSI (BB_LSI) is supplied to a controller integrated circuit (CNT_IC) of a high-output power amplifier module (HPA_ML) via an RF analog signal process semiconductor integrated circuit (RF_IC). The flow of the RF signal from the transmission/reception antenna ANT to the common input/output terminal I/O is receiving operation RX of the cellular phone. The flow of the RF signal from the common input/output terminal I/O to the transmission/reception antenna ANT is transmitting operation TX of the cellular phone.

The RFIC (RF_IC) frequency-up-converts transmission digital baseband signals TxDBI and TxDBQ from the baseband signal processor LSI (BB_LSI) to the RF transmission signal. On the contrary, the RFIC (RF_IC) frequency-down-converts the RF reception signal received by the transmission/reception antenna ANT to reception digital baseband signals RxDBI and RxDBQ, and supplies the resultant signals to the baseband signal processor LSI (BB_LSI).

The antenna switch MMIC (ANT_SW) of the RF module RF_ML establishes a signal path between the common input/output terminal I/O and any of transmission terminals Tx1 and Tx2, reception terminals Rx1 and Rx2, and transmission/reception terminals TRx1, TRx2, TRx3, and TRx4, and performs either the receiving operation RX or the transmitting operation TX. The antenna switch MMIC (ANT_SW) sets the impedance of a signal path other than a signal path established for the receiving operation RX or the transmitting operation TX to an extremely high value, thereby obtaining necessary isolation. In the field of the antenna switch, the common input/output terminal I/O is called a single pole, and the total eight terminals of the transmission terminals Tx1 and Tx2, reception terminals Rx1 and Rx2, and transmission/reception terminals TRx1, TRx2, TRx3, and TRx4 are called 8 throws. Therefore, the antenna switch MMIC (ANT_SW) of FIG. 28 is a single-pole 8-throw (SP8T) switch.

The baseband signal processor LSI (BB_LSI) is coupled to a not-shown external non-volatile memory and a not-shown application processor. The application processor is coupled to a not-shown liquid crystal display device and a not-shown key input device and can execute various application programs including a general program and a game. A boot program (start initialize program) for a mobile device such as a cellular phone, an operating system program (OS), a program for phase demodulation on a reception baseband signal and phase modulation on a transmission baseband signal in the GSM system or the like by a digital signal processor (DSP) in the baseband signal processor LSI, and various application programs can be stored in an external nonvolatile memory.

<<Transmitting/Receiving Operation of GSM850 and GSM90022>

A case where the transmission baseband signals TxDBI and TxDBQ are to be frequency-up-converted to the band of GSM850 is assumed. In this case, a transmission signal processing unit Tx_SPU in the RFIC performs frequency up-conversion on the transmission baseband signal to the band of GSM850, thereby generating an RF transmission signal Tx_GSM850 of GSM850. A case where the transmission baseband signal from BB_LSI is to be frequency-up-converted to the band of GSM900 is assumed. In this case, the transmission signal processing unit Tx_SPU in the RFIC performs frequency up-conversion on the transmission baseband signal to the band of GSM900, thereby generating an RF transmission signal Tx_GSM900 of GSM900. The RF transmission signal Tx_GSM850 of GSM850 and the RF transmission signal Tx_GSM900 of GSM900 are amplified by a high-output power amplifier HPA2 in the high-output power amplifier module (HPA_ML). An RF output of the high-output power amplifier HPA2 is supplied to the transmission terminal Tx2 of the antenna switch MMIC (ANT_SW) via a low-pass filter LPF2. The RF transmission signal Tx_GSM850 of GSM850 and the RF transmission signal Tx_GSM900 of GSM900 supplied to the transmission terminal Tx2 can be transmitted from the transmission/reception antenna ANT via the common input/output terminal I/O.

The RF reception signal Rx_GSM850 of GSM850 and the RF reception signal Rx_GSM900 of GSM900 received by the transmission/reception antenna ANT are supplied to the common input/output terminal I/O of the antenna switch MMIC (ANT_SW). An RF reception signal Rx_GSM850 of GSM850 and an RF reception signal Rx_GSM900 of GSM900 obtained from the reception terminal Rx2 of the antenna switch MMIC (ANT_SW) are amplified by low-noise amplifiers LNA5 and LNA6 in the RFIC via a surface acoustic wave filter SAW2. After that, the RF reception signals are supplied to a reception signal processing unit Rx_SPU. In the reception signal processing unit Rx_SPU, frequency-down-conversion of the RF reception signal Rx_GSM850 of GSM850 or the RF reception signal Rx_GSM900 of GSM900 to the reception baseband signals RxDBI and RxDBQ is performed.

In a transmission/reception mode of GSM850, in response to the control signal B.B_Cnt, the antenna switch MMIC performs, in a time division manner, transmission of the RF transmission signal Tx_GSM850 by coupling between the input/output terminal I/O and the transmission terminal Tx2 and reception of the RF reception signal Tx_GSM850. Similarly, also in the transmission/reception mode, in response to the control signal B.B_Cnt, the antenna switch MMIC performs, in a time division manner, transmission of the RF transmission signal Tx_GSM900 by coupling between the input/output terminal I/O and the transmission terminal Tx2 and reception of the RF reception signal Tx_GSM900 by coupling between the input/output terminal I/O and the reception terminal Rx2.

<<Transmitting/Receiving Operation of DCS1800 and PCS1900>>

A case where the transmission baseband signals TxDBI and TxDBQ from BB_LSI are to be frequency-up-converted to the band of DCS1800 is assumed. In this case, the transmission signal processing unit Tx_SPU in the RFIC performs frequency up-conversion on the transmission baseband signal to the band of DCS1800, thereby generating an RF transmission signal Tx_DCS1800 of DCS1800. A case where the transmission baseband signal from BB_LSI is to be frequency-up-converted to the band of PCS1900 is assumed. In this case, the transmission signal processing unit Tx_SPU in the RFIC performs frequency up-conversion on the transmission baseband signal to the band of PCS1900, thereby generating an RF transmission signal Tx_PCS1900 of PCS1900. The RF transmission signal Tx_DCS1800 of DCS1800 and the RF transmission signal Tx_PCS1900 of PCS1900 are amplified by a high-output power amplifier HPA1 in the high-output power amplifier module (HPA_ML). An RF output of the high-output power amplifier HPA1 is supplied to the transmission terminal Tx1 of the antenna switch-MMIC (ANT_SW) via a low-pass filter LPF1. The RF transmission signal Tx_DCS1800 of DCS1800 and the RF transmission signal Tx_PCS1900 of PCS1900 supplied to the transmission terminal Tx1 can be transmitted from the transmission/reception antenna ANT via the common input/output terminal I/O.

The RF reception signal Rx_DCS1800 of DCS1800 and the RF reception signal Rx_PCS1900 of PCS1900 received by the transmission/reception antenna ANT are supplied to the common input/output terminal I/O of the antenna switch MMIC. The RF reception signal Rx_DCS1800 of DCS1800 obtained from the reception terminal Rx1 of the antenna switch MMIC is amplified by low-noise amplifiers LNA7 and LNA8 in the RFIC (RF_IC) via a surface acoustic wave filter SAW1. The RF reception signal Rx_PCS1900 of PCS1900 obtained from the reception terminal Rx1 of the antenna switch MMIC (ANT_SW) is amplified by low-noise amplifiers LNA7 and LNA8 in the RFIC via the surface acoustic wave filter SAW1. After that, the RF reception signal Rx_DCS1800 of DCS1800 and the RF reception signal Rx_PCS1900 of PCS1900 are supplied to the reception signal processing unit Rx_SPU. In the reception signal processing unit Rx_SPU, frequency-down-conversion of the RF reception signal Rx_DCS1800 of DCS1800 or the RF reception signal Rx_PCS1900 of PCS1900 to the reception baseband signals RxDBI and RxDBQ is performed.

In a transmission/reception mode of DCS1800, in response to the control signal B.B_Cnt, the antenna switch MMIC performs, in a time division manner, transmission of the RF transmission signal Tx_DCS1800 by coupling between the input/output terminal I/O and the transmission terminal Tx1 and reception of the RF reception signal Rx_DCS1800 by coupling between the input/output terminal I/O and the reception terminal Rx1. Similarly, also in the transmission/reception mode of the PCS1900, in response to the control signal B.B_Cnt, the antenna switch MMIC performs, in a time division manner, transmission of the RF transmission signal Tx_PCS1900 by coupling between the input/output terminal I/O and the transmission terminal Tx1 and reception of the RF reception signal Rx_PCS1900 by coupling between the input/output terminal I/O and the reception terminal Rx1.

<<WCDMA Transmitting/Receiving Operation>>

A case where the transmission baseband signals TxDBI and TxDBQ from the baseband signal processor LSI (BB_LSI) are to be frequency-up-converted to the band I of WCDMA is assumed. In this case, the transmission signal processing unit Tx_SPU in the RFIC performs frequency up-conversion on the transmission baseband signal to the band I of WCDMA. An RF transmission signal Tx_WCDMA band I of WCDMA band I is amplified by a high-output power amplifier W_PA1 and supplied to a transmission/reception terminal TRx1 of the antenna switch MMIC via a duplexer DUP1. The RF transmission signal Tx_WCDMA band I of WCDMA band I supplied to the transmission/reception terminal TRx1 can be transmitted from the transmission/reception antenna ANT via the common input/output terminal I/O.

In the WCDMA system, the transmitting operation and the receiving operation can be performed in parallel by code division. Specifically, the RF reception signal Rx_WCDMA band I of WCDMA band I received by the transmission/reception antenna ANT is supplied to the common input/output terminal I/O of the antenna switch MMIC. The RF reception signal Rx_WCDMA band I of WCDMA band I obtained from the transmission/reception terminal TRx1 of the antenna switch MMIC is amplified by low-noise amplifier LNA1 in the RFIC via the duplexer DUP1 and, after that, supplied to the reception signal processing unit Rx_SPU. In the reception signal processing unit Rx_SPU, frequency-down-conversion of the RF reception signal Rx_WCDMA band I of WCDMA band I to the reception digital baseband signals RxDBI and RxDBQ is performed. In the transmission/reception parallel processing mode of WCDMA band I, in response to the control signal B.B_Cnt, the antenna switch MMIC performs, in parallel, transmission of the RF transmission signal and reception of the RF reception signal by steady coupling between the input/output terminal I/O and the transmission/reception terminal TRx1.

A case where the transmission baseband signals TxDBI and TxDBQ from the baseband signal processor LSI (BB_LSI) are to be frequency-up-converted to the band IX of WCDMA is assumed. In this case, the transmission signal processing unit Tx_SPU in the RFIC performs frequency up-conversion on the transmission baseband signals TxDBI and TxDBQ to the band IX of WCDMA. An RF transmission signal Tx_WCDMA band IX of WCDMA band IX is amplified by a high-output power amplifier W_PA2 and supplied to a transmission/reception terminal TRx2 of the antenna switch MMIC via a duplexer DUP2. The RF transmission signal Tx_WCDMA band IX of WCDMA band IX supplied to the transmission/reception terminal TRx2 can be transmitted from the transmission/reception antenna ANT via the common input/output terminal I/O.

The RF reception signal Rx_WCDMA band IX of WCDMA band IX received by the transmission/reception antenna ANT is supplied to the common input/output terminal I/O of the antenna switch MMIC. The RF reception signal Rx_WCDMA band IX of WCDMA band IX obtained from the transmission/reception terminal TRx2 of the antenna switch MMIC is amplified by low-noise amplifier LNA2 in the RFIC via the duplexer DUP2. The amplified signal from the low-noise amplifier LNA2 is supplied to the reception signal processing unit Rx_SPU. In the reception signal processing unit Rx_SPU, frequency-down-conversion of the RF reception signal Rx_WCDMA band IX of WCDMA band IX to the reception digital baseband signals RxDBI and RxDBQ is performed.

In the parallel processing mode of the transmission in the WCDMA band IX and the reception in the WCDMA band IX, in response to the control signal B.B_Cnt, the antenna switch MMIC performs, in parallel, transmission of the RF transmission signal and reception of the RF reception signal by steady coupling between the input/output terminal I/O and the transmission/reception terminal TRx2.

A case where the transmission baseband signals TxDBI and TxDBQ from the baseband signal processor LSI (BB_LSI) are to be frequency-up-converted to the band VI of WCDMA is assumed. In this case, the transmission signal processing unit Tx_SPU in the RFIC performs frequency up-conversion on the transmission baseband signals TxDBI and TxDBQ to the band VI of WCDMA. An RF transmission signal Tx_WCDMA band VI of WCDMA band VI is amplified by a high-output power amplifier W_PA3 and supplied to a transmission/reception terminal TRx3 of the antenna switch MMIC via a duplexer DUP3. The RF transmission signal Tx_WCDMA band VI of WCDMA band VI supplied to the transmission/reception terminal TRx3 can be transmitted from the transmission/reception antenna ANT via the common input/output terminal I/O.

The RF reception signal Rx_WCDMA band VI of WCDMA band VI received by the transmission/reception antenna ANT is supplied to the common input/output terminal I/O of the antenna switch MMIC. The RF reception signal Rx_WCDMA band VI of WCDMA band VI obtained from the transmission/reception terminal TRx3 of the antenna switch MMIC is amplified by low-noise amplifier LNA3 in the RFIC via the duplexer DUP3. The amplified signal from the low-noise amplifier LNA3 is supplied to the reception signal processing unit Rx_SPU. In the reception signal processing unit Rx_SPU, frequency-down-conversion of the RF reception signal Rx_WCDMA band VI of WCDMA band VI to the reception digital baseband signals RxDBI and RxDBQ is performed.

In the parallel processing mode of the transmission in the WCDMA band VI and the reception in the WCDMA band VI, in response to the control signal B.B_Cnt, the antenna switch MMIC performs, in parallel, transmission of the RF transmission signal and reception of the RF reception signal by steady coupling between the input/output terminal I/O and the transmission/reception terminal TRx3.

A case where the transmission baseband signals TxDBI and TxDBQ from the baseband signal processor LSI (BB_LSI) are to be frequency-up-converted to the band XI of WCDMA is assumed. In this case, the transmission signal processing unit Tx_SPU in the RFIC performs frequency up-conversion on the transmission baseband signals TxDBI and TxDBQ to the band XI of WCDMA. An RF transmission signal Tx_WCDMA band XI of WCDMA band XI is amplified by a high-output power amplifier W_PA4 and supplied to a transmission/reception terminal TRx4 of the antenna switch MMIC via a duplexer DUP4. The RF transmission signal Tx_WCDMA band XI of WCDMA band XI supplied to the transmission/reception terminal TRx4 can be transmitted from the transmission/reception antenna ANT via the common input/output terminal I/O.

The RF reception signal Rx_WCDMA band XI of WCDMA band XI received by the transmission/reception antenna ANT is supplied to the common input/output terminal I/O of the antenna switch MMIC. The RF reception signal Rx_WCDMA band XI of WCDMA band. XI obtained from the transmission/reception terminal TRx4 of the antenna switch MMIC is amplified by low-noise amplifier LNA4 in the RFIC via the duplexer DUP4. The amplified signal from the low-noise amplifier LNA4 is supplied to the reception signal processing unit Rx_SPU. In the reception signal processing unit Rx_SPU, frequency-down-conversion of the RF reception signal Rx_WCDMA band XI of WCDMA band XI to the reception digital baseband signals RxDBI and RxDBQ is performed.

In the parallel processing mode of the transmission in the WCDMA band XI and the reception in the WCDMA band XI, in response to the control signal B.B_Cnt, the antenna switch MMIC performs, in parallel, transmission of the RF transmission signal and reception of the RF reception signal by steady coupling between the input/output terminal I/O and the transmission/reception terminal TRx4.

The invention achieved by the inventors herein has been concretely described on the basis of the embodiments. Obviously, the invention is not limited to the embodiments but can be variously modified without departing from the gist.

For example, in the cellular phone shown in FIG. 20, the RFIC for communication and the baseband signal processor LSI are formed in different semiconductor chips. In another embodiment, they can be formed in an integrated single chip.

The present invention is not limited to the direct up-conversion (DUP) architecture and the direct down-conversion (DDC) architecture. For example, the invention can be applied to a low IF down-conversion receiver architecture for converting a reception RF signal to a relatively low intermediate frequency reception signal, a digital IF down-conversion receiver architecture, or a low IF up-conversion transmitter architecture for converting a relatively low intermediate frequency transmission signal to a transmission RF signal.

What is claimed is:

1. A transceiver comprising:
a receiver; and
a transmitter,
wherein the receiver includes a reception demodulator to down-convert an RF reception signal to a reception analog signal,
wherein the transmitter includes a voltage-controlled oscillator for transmission and a plurality of transmission blocks to generate RF transmission signals of a plurality of frequency bands,
wherein each of the transmission blocks includes a frequency divider and a modulator for transmission,
wherein, in each of the transmission blocks, the frequency divider supplies a pair of transmission local signals generated by dividing a transmission oscillation output signal supplied from the voltage-controlled oscillator for transmission to the modulator for transmission,
wherein, in each of the transmission blocks, the modulator for transmission up-converts a transmission analog signal to an RF transmission signal based on the pair of transmission local signals supplied from the frequency divider,
wherein, for at least one of the transmission blocks, the frequency divider has a frequency dividing number set to an even-numbered integer, and
wherein, for an other transmission block, the frequency divider has a frequency dividing number set to a non-integer.

2. The transceiver according to claim 1, wherein the transmitter further includes a pair of D/A converters to covert a pair of transmission digital signals to the pair of transmission local signals, the pair of D/A converters being shared by the transmission blocks.

3. The transceiver according to claim 2,
wherein the transmission blocks include a first transmission block with the frequency divider having a frequency dividing number set to 2 and a second transmission block with the frequency divider having a frequency dividing number set to 4,
wherein the frequency dividing number of the frequency divider included in the other transmission block is set to 2.5,
wherein frequency of the transmission oscillation output signal generated from the voltage-controlled oscillator for transmission can be set between about 3 GHz to about 4 GHz, and
wherein the first transmission block generates an RF transmission signal of a transmission band from about 1.8 GHz to about 2 GHz, the second transmission block generates an RF transmission signal of a transmission band of about 0.8 GHz, and the other transmission block generates an RF transmission signal of a transmission band of about 1.4 GHz.

4. The transceiver according to claim 3, wherein the transmitter has one of a direct up-conversion transmitter architecture and a low IF up-conversion transmitter architecture.

5. The transceiver according to claim 4, wherein the transmitter is constructed in a semiconductor chip.

6. The transceiver according to claim 1,
wherein the receiver includes a voltage-controlled oscillator for reception, and a plurality of reception blocks to receive a plurality of RF reception signals of frequency bands,
wherein each of the reception blocks includes a frequency divider and a demodulator for reception,
wherein, in each of the reception blocks, the frequency divider supplies a pair of reception local signals generated by dividing a reception oscillation output signal supplied from the voltage-controlled oscillator for reception to the demodulator for reception,
wherein, in each of the reception blocks, the modulator for reception down-converts an RF reception signal to a reception analog signal based on the pair of reception local signals supplied from the frequency divider,
wherein, for at least one of the reception blocks, the frequency divider has a frequency dividing number set to an even-numbered integer, and
wherein, for an other reception block, the frequency divider has a frequency dividing number set to a non-integer.

7. The transceiver according to claim 6,
wherein the transmitter further includes a pair of D/A converters to convert a pair of transmission digital signals to the pair of transmission local signals, the pair of D/A converters being shared by the transmission blocks, and
wherein the receiver further includes a pair of A/D converters to convert the pair of reception local signals to a pair of reception digital signals, the pair of A/D converters being shared by the reception blocks.

8. The transceiver according to claim 7,
wherein the transmission blocks include a first transmission block with the frequency divider having a frequency dividing number set to 2 and a second transmission block with the frequency divider having a frequency dividing number set to 4,
wherein the frequency dividing number of the frequency divider included in the other transmission block is set to 2.5,
wherein frequency of the transmission oscillation output signal generated from the voltage-controlled oscillator for transmission can be set between about 3 GHz to about 4 GHz,
wherein the first transmission block generates an RF transmission signal of a transmission band from about 1.8 GHz to about 2 GHz, the second transmission block generates an RF transmission signal of a transmission band of about 0.8 GHz, the other transmission block generates an RF transmission signal of a transmission band of about 1.4 GHz,
wherein the reception blocks include a first reception block with the frequency divider having a frequency dividing number set to 2 and a second reception block with the frequency divider having a frequency dividing number set to 4,
wherein frequency dividing number of the frequency divider included in the other reception block is set to 2.5,
wherein frequency of the reception oscillation output signal generated from the voltage-controlled oscillator for reception can be set between about 3.5 GHz to about 4.5 GHz, and
wherein the first reception block receives an RF transmission signal of a reception band from about 1.9 GHz to about 2.2 GHz, the second reception block receives an RF reception signal of a reception band from about 0.8 GHz to about 0.9 GHz, and the other reception block receives an RF reception signal of a reception band from about 1.4 GHz to about 1.5 GHz.

9. The transceiver according to claim 8,
wherein the transmitter has one of a direct up-conversion transmitter architecture and a low IF up-conversion transmitter architecture, and the receiver has one of a direct down-conversion receiver architecture and a low IF down-conversion receiver architecture, and
wherein the transmitter and the receiver are constructed in a semiconductor chip.

10. The transceiver according to claim 1,
wherein the frequency divider included in the other transmission block comprises:
a 1/5 frequency divider including four D-type flip flops and a first NOR circuit;
a trigger signal generating unit including two AND circuits and an OR circuit; and
a 1/2 frequency divider including two D-type flip flops.

11. The transceiver according to claim 10,
wherein two D-type flip flops of the four D-type flip flops output a first pair of signals having a duty ratio of 40% at a frequency of 1/5 of a clock input signal frequency and having a phase difference of 180 degrees from each other,
wherein a first of the two AND circuits is supplied with a first signal of the first pair of signals and calculates a first logical product between an opposite phase of a clock input signal and the first signal,
wherein a second of the two AND circuits is supplied with a second signal of the first pair of signals and calculates a second logical product between a positive phase of the clock input signal and the second signal,
wherein the OR circuit is supplied with the first logical product and the second logical product, calculates a logical sum of the first logical product and the second logical product, and outputs a trigger signal to be supplied to the 1/2 frequency divider,
wherein the 1/2 frequency divider generates a second pair of signals consisting of an I-side local signal synchronized with a positive edge of the trigger signal and a Q-side local signal synchronized with a negative edge of the trigger signal, and
wherein the second pair of signals has a cycle of 2.5 times as long as a cycle of the clock input signal and a phase difference of non-90 degrees from each other.

12. The transceiver according to claim 11,
wherein the frequency divider included in the other transmission block further comprises:
a second NOR circuit supplied with the first pair of signals to calculate a negative logical sum of the first pair of signals to output a reset signal for the 1/2 frequency divider.

13. A transceiver comprising:
a receiver; and
a transmitter,
wherein the transmitter includes a transmission modulator to up-convert a transmission analog signal to an RF transmission signal,
wherein the receiver includes a voltage-controlled oscillator for reception and a plurality of reception blocks to receive a plurality of RF reception signals of frequency bands, wherein each of the reception blocks includes a frequency divider and a demodulator for reception, wherein, in each of the reception blocks, the frequency divider supplies a pair of reception local signals generated by dividing a reception oscillation output signal supplied from the voltage-controlled oscillator for reception to the demodulator for reception, wherein, in each of the reception blocks, the modulator for reception down-converts an RF transmission signal to a reception analog signal based on the pair of reception local signals supplied from the frequency divider, wherein, for at least one of the reception blocks, the frequency divider has a frequency dividing number set to an even-numbered integer, and wherein, for an other reception block, the frequency divider has a frequency dividing number set to a non-integer.

14. The transceiver according to claim 13, wherein the receiver further includes a pair of A/D converters to convert the pair of reception analog signals to a pair of reception digital signals, and the pair of A/D converters are shared by the reception blocks.

15. The transceiver according to claim 14, wherein the reception blocks include a first reception block with the frequency divider having a frequency dividing number set to 2 and a second reception block with the frequency divider having a frequency dividing number set to 4, wherein the frequency dividing number of the other frequency divider included in the other reception block is set to 2.5, wherein frequency of the reception oscillation output signal generated from the voltage-controlled oscillator for reception can be set between about 3.5 GHz to about 4.5 GHz, and wherein the first reception block receives an RF transmission signal of a reception band from about 1.9 GHz to about 2.2 GHz, the second reception block receives an RF reception signal of a reception band from about 0.8 GHz to about 0.9 GHz, and the other reception block receives an RF reception signal of a reception band from about 1.4 GHz to about 1.5 GHz.

16. The transceiver according to claim 14, wherein the receiver has one of a direct down-conversion receiver architecture and a low IF down-conversion receiver architecture.

17. The transceiver according to claim 16, wherein the receiver is constructed in a semiconductor chip.

18. The transceiver according to claim 13, wherein the frequency divider included in the other transmission block comprises:

a 1/5 frequency divider including four D-type flip flops and a first NOR circuit;

a trigger signal generating unit including two AND circuits and an OR circuit; and a 1/2 frequency divider including two D-type flip flops.

19. The transceiver according to claim 18, wherein two D-type flip flops of the four D-type flip flops output a first pair of signals having a duty ratio of 40% at a frequency of 1/5 of a clock input signal frequency and having a phase difference of 180 degrees from each other, wherein a first of the two AND circuits is supplied with a first signal of the first pair of signals and calculates a first logical product between an opposite phase of a clock input signal and the first signal, wherein a second of the two AND circuits is supplied with a second signal of the first pair of signals and calculates a second logical product between a positive phase of the clock input signal and the second signal, wherein the OR circuit is supplied with the first logical product and the second logical product, calculates a logical sum of the first logical product and the second logical product, and outputs a trigger signal to be supplied to the 1/2 frequency divider, wherein the 1/2 frequency divider generates a second pair of signals consisting of an I-side local signal synchronized with a positive edge of the trigger signal and a Q-side local signal synchronized with a negative edge of the trigger signal, and wherein the second pair of signals has a cycle of 2.5 times as long as a cycle of the clock input signal and a phase difference of non-90 degrees from each other.

20. The transceiver according to claim 19, wherein the frequency divider included in the other transmission block further comprises:

a second NOR circuit supplied with the first pair of signals to calculate a negative logical sum of the first pair of signals to output a reset signal for the 1/2 frequency divider.

* * * * *